United States Patent
Findenig et al.

(10) Patent No.: US 12,248,088 B2
(45) Date of Patent: Mar. 11, 2025

(54) EFFICIENT PROGRAMMING MODEL FOR REAL-TIME RADAR SEQUENCING IN A RADAR DEVICE

(71) Applicant: Infineon Technologies AG, Neubiberg (DE)

(72) Inventors: Rainer Findenig, Linz (AT); Bernhard Greslehner-Nimmervoll, Hagenberg Im Mühlkreis (AT); Grigory Itkin, Munich (DE); Markus Josef Lang, Pfarrkirchen (AT); Ulrich Moeller, Holzkirchen (DE); Martin Wiessflecker, Graz (AT)

(73) Assignee: Infineon Technologies AG, Neubiberg (DE)

( * ) Notice: Subject to any disclaimer, the term of this patent is extended or adjusted under 35 U.S.C. 154(b) by 576 days.

(21) Appl. No.: 17/541,687

(22) Filed: Dec. 3, 2021

(65) Prior Publication Data
US 2023/0176180 A1    Jun. 8, 2023

(51) Int. Cl.
*G01S 7/35* (2006.01)
*G01S 13/02* (2006.01)

(52) U.S. Cl.
CPC ............... *G01S 7/35* (2013.01); *G01S 13/02* (2013.01)

(58) Field of Classification Search
CPC .................................. G01S 7/35; G01S 13/02
See application file for complete search history.

(56) References Cited

U.S. PATENT DOCUMENTS

| | | | |
|---|---|---|---|
| 9,575,160 B1* | 2/2017 | Davis | G01S 7/35 |
| 2004/0073395 A1* | 4/2004 | Furse | G01R 31/11 |
| | | | 702/108 |
| 2016/0277546 A1 | 9/2016 | Unhold | |
| 2018/0074173 A1* | 3/2018 | Trotta | G01S 13/931 |
| 2018/0136667 A1* | 5/2018 | Jimenez Hernandez | |
| | | | H04W 4/40 |
| 2018/0326902 A1* | 11/2018 | Hashimoto | H04R 3/00 |
| 2019/0250247 A1 | 8/2019 | Schmid et al. | |

* cited by examiner

*Primary Examiner* — Vladimir Magloire
*Assistant Examiner* — Hailey R Le
(74) *Attorney, Agent, or Firm* — Harrity & Harrity, LLP

(57) ABSTRACT

A radar semiconductor chip includes a radar circuit component configured to generate at least part of a frequency-modulated ramp signal or process at least part of a reflected frequency-modulated ramp signal according to a control parameter; a memory configured to store a sequencing program associated with regulating the control parameter, wherein the sequencing program specifies a first data source, external to the sequencing program, that is configured to provide a first data value corresponding to the control parameter; and a decoder configured to read the sequencing program, access the first data value from the first data source specified by the sequencing program, derive a first control value for the control parameter from the first data value, and provide the first control value to the radar circuit component. The radar circuit component regulates a controlled circuit function in accordance with the control parameter based on the first control value.

30 Claims, 9 Drawing Sheets

EFFICIENT PROGRAMMING MODEL FOR REAL-TIME RADAR SEQUENCING IN A RADAR DEVICE

BACKGROUND

A radar application, such as an automotive frequency-modulated continuous-wave (FMCW) application, may rely on transmitting frequency sweeps (also referred to as frequency ramps), where a given frequency ramp is defined by a start frequency, a stop frequency, and a duration (e.g., a period of time over which the frequency changes). In operation, multiple frequency ramps are concatenated and repeated to form a so-called frequency ramp scenario for use in the radar application. In addition to generation of frequency ramps, other on- and off-chip functions (e.g., transmit channels, analog-to-digital converters (ADCs), monitoring components, power amplifiers, or the like) and also value settings (e.g., low- and high-pass corner frequency) need to be controlled synchronously to the frequency ramps. The execution timing of these settings needs to be cycle-accurate, which, in modern systems, usually means that all of those parameters can be defined on a cycle-accurate grid.

Several ramps are concatenated to a ramp sequence, which, in practice, usually consists of a few hundred to several thousand repetitions of a ramp. However, for example, for interference mitigation or to counteract noise in their own system, integrators require a significant amount of configurability. Simply repeating the same frequency ramp over and over again is not enough. Instead, several parameters of the ramp, such as the time delay to its predecessor, its start frequency, its output power, its output phase offset, the exact point in time when sampling in the receive chain starts, the receive chain's settings such as gain, filter settings, and sampling rate should ideally be configurable on a per-ramp basis.

Existing approaches are usually either very limited in the flexibility they offer, or require a large amount of on-chip memory to define each and every ramp. While the former is an obvious drawback, the latter is also less than ideal for the integrator because the ramp sequence data has to be stored or generated on the microcontroller and thus affects the amount of memory available to the integrator. Furthermore, transferring large amounts of ramp sequence data to the radar monolithic millimeter-wave integrated circuit (MIMIC) can take a significant amount of time due to the limited speed of the communication interface between the microcontroller and the MIMIC. This is especially relevant if the ramp sequence data should, for example, be changed on the fly depending on the current environment and surrounding of the vehicle (e.g., highways versus cities). Finally, the MIMIC needs to have enough memory available to store one or more ramp sequence data sets, which increases die size and thereby the power consumption and the manufacturing costs.

Accordingly, a programming model that offers high flexibility while minimizing the amount of data is an essential benefit for an MIMIC. However, since the ramp sequence data is usually programmed on a use case basis, usability is a third important dimension to consider. Therefore, a programming model that offers a significant improvement in terms of all three mentioned dimensions (memory size, data transmission time, integrator usability/differentiation) compared to other MMICs may be desirable. In terms of flexibility, a programming model that offers complete control over every single aspect for every single ramp and complete freedom in concatenating arbitrary ramp segments to actual ramps may also be desirable.

SUMMARY

In some aspects, the techniques described herein relate to a radar semiconductor chip, including: a ramp signal generator configured to generate a frequency-modulated ramp signal including a plurality of frequency ramps, wherein the ramp signal generator is configured to generate the plurality of frequency ramps according to a plurality of ramp parameters; a memory configured to store a sequencing program associated with generating the frequency-modulated ramp signal, wherein the sequencing program specifies a first data source, external to the sequencing program, that is configured to provide a first data value corresponding to a first ramp parameter of the plurality of ramp parameters; and a decoder configured to read the sequencing program from the memory, access the first data value from the first data source specified by the sequencing program, derive a first control value for the first ramp parameter from the first data value, and provide the first control value to the ramp signal generator, wherein the ramp signal generator is configured to generate a first frequency ramp of the plurality of frequency ramps having the first ramp parameter defined by the first control value.

In some aspects, the techniques described herein relate to a radar semiconductor chip, including: a radar circuit component configured to generate at least part of a frequency-modulated ramp signal or process at least part of a reflected frequency-modulated ramp signal according to a control parameter; a memory configured to store a sequencing program associated with regulating the control parameter, wherein the sequencing program specifies a first data source, external to the sequencing program, that is configured to provide a first data value corresponding to the control parameter; and a decoder configured to read the sequencing program from the memory, access the first data value from the first data source specified by the sequencing program, derive a first control value for the control parameter from the first data value, and provide the first control value to the radar circuit component, wherein the radar circuit component is configured to regulate a controlled circuit function in accordance with the control parameter based on the first control value.

In some aspects, the techniques described herein relate to a radar semiconductor chip, including: a ramp signal generator configured to generate a frequency-modulated ramp signal including a plurality of frequency ramps, wherein the ramp signal generator is configured to generate the plurality of frequency ramps according to a plurality of ramp parameters; a memory configured to store a sequencing program associated with generating the frequency-modulated ramp signal, wherein the sequencing program defines a dynamic control value for a first ramp parameter of the plurality of ramp parameters, wherein the dynamic control value changes on at least one of a ramp segment-by-ramp segment basis, a ramp-by-ramp basis, a subframe-by-subframe basis, or a frame-by-frame; a decoder configured to read the sequencing program from the memory, calculate the dynamic control value for each frequency ramp of the plurality of frequency ramps based on a previous control value and an offset control value defined by the sequencing program, and provide the dynamic control value to the ramp signal generator, wherein the ramp signal generator is configured to generate the plurality of frequency ramps having the first ramp parameter defined by the dynamic control value that changes on the at least one of the ramp segment-by-ramp segment basis, the ramp-by-ramp basis, the subframe-by-subframe basis, or the frame-by-frame according to the offset control value.

In some aspects, the techniques described herein relate to a radar semiconductor chip, including: a radar circuit component configured to generate at least part of a frequency-modulated ramp signal or process at least part of a reflected frequency-modulated ramp signal according to a control parameter; a memory configured to store a sequencing program associated with regulating the control parameter, wherein the sequencing program defines a dynamic control value for the control parameter, wherein the dynamic control value changes on at least one of a ramp segment-by-ramp segment basis, a ramp-by-ramp basis, a subframe-by-subframe basis, or a frame-by-frame basis of the frequency-modulated ramp signal; and a decoder configured to read the sequencing program from the memory, calculate the dynamic control value that corresponds to one of the plurality of frequency ramps based on a previous control value and an offset control value defined by the sequencing program, and provide the dynamic control value to the radar circuit component, wherein the radar circuit component is configured to regulate a controlled circuit function in accordance with the control parameter based on the dynamic control value that changes on the at least one of the ramp segment-by-ramp segment basis, the ramp-by-ramp basis, the subframe-by-subframe basis, or the frame-by-frame according to the offset control value.

In some aspects, the techniques described herein relate to a method for controlling a radar circuit component of a radar semiconductor chip, wherein the radar circuit component is configured to generate at least part of a frequency-modulated ramp signal or process at least part of a reflected frequency-modulated ramp signal according to a control parameter, the method including: storing, by a memory, a sequencing program associated with regulating the control parameter, wherein the sequencing program specifies a first data source, external to the sequencing program, that is configured to provide a first data value corresponding to the control parameter; reading, by a decoder, the read the sequencing program from the memory; accessing, by the decoder, the first data value from the first data source specified by the sequencing program; deriving, by the decoder, a first control value for the control parameter from the first data value; providing, by the decoder, the first control value to the radar circuit component for controlling the control parameter; and regulating a controlled circuit function, by the radar circuit component, in accordance with the control parameter based on the first control value.

BRIEF DESCRIPTION OF THE DRAWINGS

Embodiments are described herein making reference to the appended drawings.

DETAILED DESCRIPTION

Figure 1:
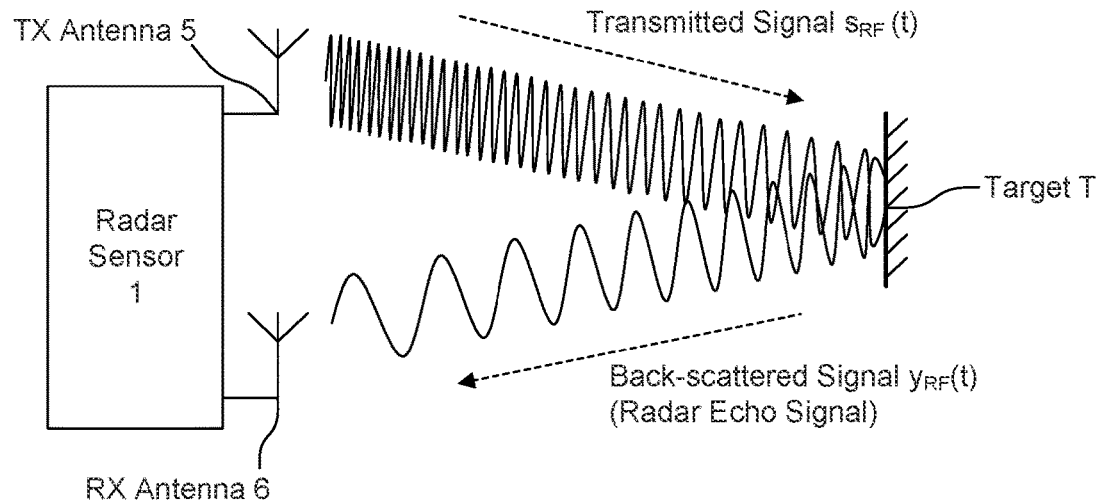
FIG. 1 is a drawing illustrating the operating principle of a frequency-modulated continuous-wave (FMCW) radar system for distance and/or velocity measurement according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a RAM, a ROM, a PROM, an EPROM, an EEPROM, a FLASH memory, register memory, or an electronic memory device.

Each of the elements of the present disclosure may be configured by implementing dedicated hardware or a software program on a memory controlling a processor to perform the functions of any of the components or combinations thereof. Processing components may be implemented as a central processing unit (CPU) or other processor reading and executing a software program or instruction set from a recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPGAs), programmable logic controller (PLC), or other equivalent integrated or discrete logic circuitry.

Accordingly, the term "processor," as used herein refers to any of the foregoing structures or any other structure suitable for implementation of the techniques described herein. A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals from one or more components and perform signal conditioning or processing thereon. Signal conditioning, as used herein, refers to manipulating a signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Thus, a signal processing circuit may include an analog-to-digital converter (ADC) that converts the analog signal from the one or more sensor elements to a digital signal. The signal processing circuit may also include a DSP that performs some processing on the digital signal.

Embodiments are discussed below in the context of a radar system. It should be noted, however, that the described embodiments may also be applied in applications different from radar such as, for example, RF transceivers of RF communication devices.

FIG. 1 illustrates a frequency-modulated continuous-wave (FMCW) radar system 1. In the present example, separate transmission (TX) and reception (RX) antennas 5 and 6, respectively, are used. However, it is noted that a single antenna can be used so that the transmission antenna and the reception antenna are physically the same (monostatic radar configuration). It will be appreciated that "(t)" denotes an analog signal defined as a continuous wave that may change over a time period t, and "(k)" denotes a digital signal defined as a discrete wave, where k is an integer and may represent a kth digital sample or a digital signal containing k digital samples. A signal may be represented with or without its analog or digital domain identifier (t) and (k), respectively.

The transmission antenna continuously radiates an RF signal $S_{RF}(t)$, which is frequency-modulated, for example, by a periodic linear frequency ramp signal (also referred to as frequency sweep or chirp signal). The transmitted signal $S_{RF}(t)$ is back-scattered at a target T, which is located in the radar channel within the measurement range of the radar device. The back-scattered signal $y_{RF}(t)$ is received by the reception antenna 6 as a radar echo. In the depicted example, the back-scattered signal is denoted as $y_{RF}(t)$.

Figure 2:
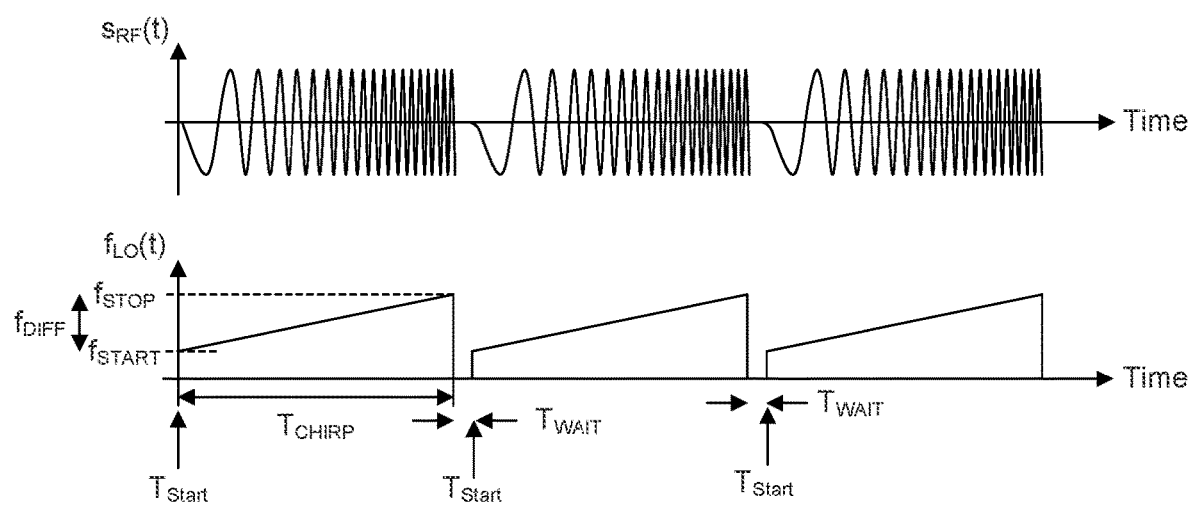
FIG. 2 includes two timing diagrams illustrating the frequency modulation of the radio frequency (RF) signal used in FMCW radar systems according to one or more embodiments.

FIG. 2 includes two timing diagrams illustrating the frequency modulation of the RF signal $S_{RF}(t)$ used in FMCW radar systems. As shown in FIG. 2, the signal $S_{RF}(t)$ may be composed of a plurality of frequency ramps or "chirps", that is to say the signal $S_{RF}(t)$ comprises a sequence of sinusoidal signal profiles (waveforms) with rising frequency (up-chirp) or falling frequency (down-chirp). In the present example, the instantaneous frequency $f_{LO}(t)$ of a chirp increases linearly, starting at a start frequency $f_{START}$ to a stop frequency $f_{STOP}$ within a time interval $T_{CHIRP}$. Such chirps are also referred to as linear frequency ramps. The stop frequency $f_{STOP}$ may also be defined by a frequency difference $f_{DIFF}$, where $f_{STOP}=f_{START}+f_{DIFF}$. The start frequency $f_{START}$ may also be set according to a base frequency $f_{BASE}$ and a frequency offset $f_{OFFSET}$ (e.g., $f_{START}=f_{BASE}+f_{OFFSET}$), where the frequency offset $f_{OFFSET}$ may be a positive or negative value.

A frequency-modulated ramp signal, such as local oscillator signal used for generating a radar signal, may include a plurality of radar frames which may also be referred to as radar operation cycles or chirp frames. A sequence of ramps may make up each a radar frame. For example, a radar operation cycle may include several hundreds of radar ramps (sweeps) taking up to 1-30 ms in total. A frame length of the radar frame corresponds to one radar operation cycle. It is also to be noted that consecutive ramps have a short pause $T_{WAIT}$ or wait interval therebetween and a longer pause may be used between consecutive radar frames. The longer pause between consecutive radar frames may be referred to as a configuration interval during which one or more ramp parameters of the RF signal $S_{RF}(t)$ can be adjusted for subsequent radar frames. A ramp start time $T_{START}$ indicates a start time for each chirp and may be a predetermined interval according to, for example, a number of clock cycles. The ramp start time $T_{START}$ may also be implicitly defined by $f_{START}$, $f_{STOP}$, $T_{CHIRP}$, and $T_{WAIT}$.

It will be appreciated that the start frequency $f_{START}$ and stop frequency $f_{STOP}$ of the ramps may be within a frequency band with minimum frequency Fmin and maximum frequency Fmax. As such, frequency Fmin and frequency Fmax define an operating frequency range or the frequency band usable for the ramping signals, and, thus, the frequency range or the frequency band of the radar application of the radar MMIC. In some embodiments, the frequency range defined by a single ramp having start and stop frequencies $f_{START}$ and $f_{STOP}$ may be smaller than the usable radar frequency band. However, all ramps that are generated during operation lie between the frequencies Fmin and Fmax of the radar frequency band (e.g., between 76-81 GHz) used for generating the ramping signals.

Thus, a plurality of ramp parameters may be used to define the actual frequency ramps of a ramp signal, their transmission processing, their transmission, their reception, and their receiver processing. For example, in addition to those ramp parameters already mentioned, a frequency ramp or a sequence of frequency ramps may be configured with other ramp parameters, such as transmission output power, output phase, output phase offset, sampling start time time, sampling rate, number of samples, receiver gain, MIMIC output pin setting, and one or more receiver and/or transmitter filter settings (e.g., filter settings for better linearity in a PLL). Which transmission channel of a multi-transmission channel radar MIMIC is selected for transmission of the ramp or ramp sequence and/or which receive channel of a multi-receive channel radar MMIC is selected may also be configured as a ramp parameter.

FIG. 2 illustrates three identical linear frequency ramps or chirps. It is noted, however, that the parameters $f_{START}$, $f_{STOP}$, $T_{CHIRP}$, as well as the pause $T_{WAIT}$ between the individual frequency ramps may vary from ramp segment-to-ramp segment, ramp-to-ramp, subframe-to-subframe, or frame-to-frame dependent on the actual implementation and use of the radar device 1. In practice, the frequency variation may be, for example, linear (linear ramp, frequency ramp), exponential (exponential ramp), or hyperbolic (hyperbolic ramp). In some embodiments, the frequency may decrease instead of increase during time $T_{CHIRP}$. Furthermore, in other embodiments the center frequency of each ramp (and therefore $f_{START}$ and $f_{STOP}$) may vary (e.g., from ramp-to-ramp or after detecting an interference) to allow using the full or a part of the frequency band. In one example, the frequency band has a minimum frequency Fmin of 76 GHz and a maximum frequency Fmax of 81 GHz.

Thus, while three identical linear frequency ramps or chirps with the same start frequency $f_{START}$ and stop frequency $f_{STOP}$ are illustrated in FIG. 2, it is contemplated that the start frequency $f_{START}$ and stop frequency $f_{STOP}$, or any other ramp parameter, may vary within a radar frame or across multiple radar frames. Each ramp may comprise of two or more ramp segments, including a payload segment (i.e., the ramp) and a flyback segment during which the frequency transitions from the stop frequency to a wait frequency or a next start frequency. One or more ramps may also include a wait segment that spans the wait interval $T_{WAIT}$ at the wait frequency. An instruction set read by a sequencing circuit may be used to describe the ramp configuration over time. The instruction set may include specific instructions for each segment of each ramp of for each segment of a sequency of ramps. By way of example, the instruction set can comprise first specific instructions for the configuration of the circuit elements of a transmit channel and/or of a receive channel and also second specific instructions for the configuration of frequency parameters of the radar transmission signal (i.e., a ramp signal) generated by a ramp sequence generator. The instructions can be embodied as operation codes (opcodes) in, for example, a programmable microprocessor. One segment of opcodes may be directed to the payload segment of the frequency ramps, one segment of opcodes may be directed to the flyback segment of the frequency ramps, and one segment of opcodes may be directed to the wait segment of the frequency ramps, with various ramp parameters within each ramp segment being configured according to a respective opcode segment. Loops, including nested loops, may be used to define parameter sets that are performed a predetermined number of times before advancing to a new parameter set. Even more complex segment scenarios are possible, for example, a second payload instead of the flyback segment, or two (or more) payload segments, with or without wait segments between them, followed by one flyback covering all payload segments are also possible.

Figure 3:
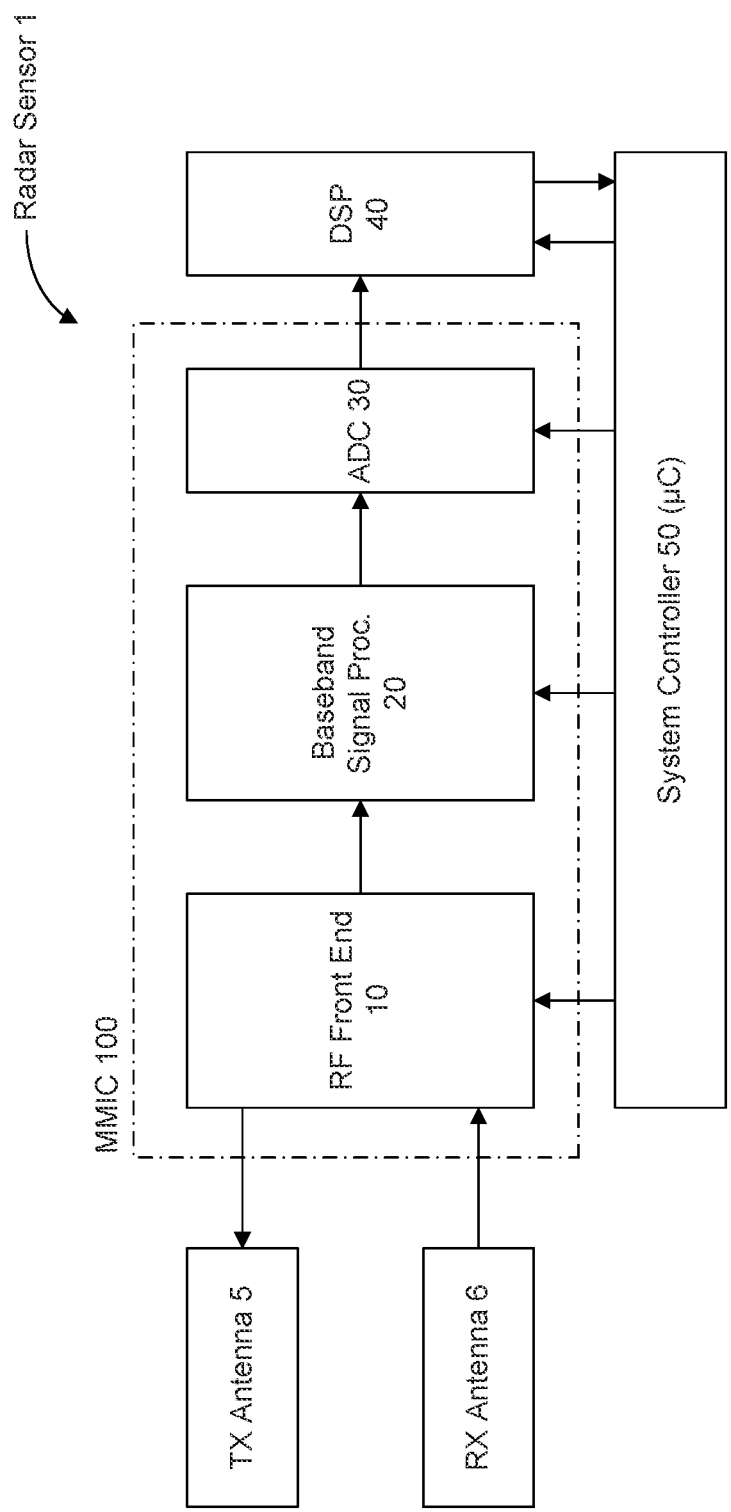
FIG. 3 is a block diagram illustrating the basic structure of an FMCW radar device according to one or more embodiments.

A local oscillator signal $S_{LO}(t)$ is used to generate the RF signal $S_{RF}(t)$ (i.e., the ramp signal). Thus, is can be said that the local oscillator signal $S_{LO}(t)$ and the RF signal $S_{RF}(t)$ are frequency-modulated ramp signals that are generated within an operating frequency range (e.g., a predefined radar frequency range). For example, the local oscillator signal $S_{LO}(t)$ is a frequency-modulated ramp signal that includes a plurality of frequency ramps each starting at a respective ramp start frequency and ending at a respective ramp stop frequency and the respective ramp start frequencies and the respective ramp stop frequencies of the plurality of frequency ramps define a frequency range within the bounds of the operating frequency range. The frequency range of the plurality of frequency ramps is defined by the lowest start frequency $f_{START}$ and the highest stop frequency $f_{STOP}$ among the frequency ramps in a given time interval. As noted above, the start frequency $f_{START}$ and the stop frequency $f_{STOP}$ of a sequence of frequency ramps may be the same and thus the center frequency of each ramp may be constant. Alternatively, the center frequency of each ramp (and therefore $f_{START}$ and $f_{STOP}$) may vary from ramp to ramp or after detecting an interference. The bandwidth (i.e., frequency range) of each ramp may also vary from ramp to ramp or after detecting an interference FIG. 3 is a block diagram that illustrates an exemplary structure of a radar device 1 (radar sensor). It is noted that a similar structure may also be found in RF transceivers used in other applications such as, for example, in wireless communications systems. Accordingly, at least one transmission antenna 5 (TX antenna) and at least one reception antenna 6 (RX antenna) are connected to an RF frontend 10, which may be integrated in a monolithic microwave integrated circuit (MMIC) 100.

The RF frontend 10 may include all the circuit components needed for RF signal processing. Such circuit components may (but need not necessarily) include, for example, a local oscillator (LO), RF power amplifiers, low noise amplifiers (LNAs), directional couplers such as rat-race-couplers and circulators, and mixers for the down-conversion (demodulation) of RF signals (e.g., the received signal $y_{RF}(t)$, see FIG. 1) into the baseband or an intermediate frequency (IF) band.

It is noted that antenna-arrays may be used instead of single antennas. The depicted example shows a bistatic (or pseudo-monostatic) radar system which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include several transmission (TX) and reception (RX) channels, which among others allows the measurement of the direction (direction of arrival (DoA)), from which the radar echoes are received.

In the case of a FMCW radar system, the transmitted RF signals radiated by the TX antenna 5 are in the range between approximately 20 GHz and 100 GHz (e.g., in the frequency band 21 to 26 GHz or in the frequency band 76 to 81 GHz). As mentioned, the RF signal $y_{RF}(t)$ received by the RX antenna 6 includes the radar echoes, i.e., the signal back-scattered at the so-called radar targets.

The received RF signals $y_{RF}(t)$ are down-converted into the baseband (IF band) and further processed in the baseband using analog signal processing (see FIG. 3, baseband signal processing chain 20), which basically includes filtering and amplification of the baseband signal. The baseband signal may also be referred to as analog radar data. It will be appreciated that if the received RF signals are down-converted into the IF band, the baseband signal processing chain 20 may be referred to as an IF signal processing chain. Thus, the analog baseband signal processing chain 20, in general, may also be referred to as an analog signal processing chain 20. The baseband signal is finally digitized using one or more analog-to-digital converters (ADC) 30 and further processed in the digital domain (see FIG. 3, digital signal processing chain implemented, e.g., in digital signal processor (DSP) 40). Thus, the ADC 30 is configured to generate a digital signal y(k) from the down-converted baseband signal.

The RF frontend 10 and the analog baseband signal processing chain 20 may be integrated in a single MIMIC 100 (i.e., a single semiconductor chip). Optionally, the ADC 30 may also be integrated in the MMIC 100 and outputs the digital signal y(k) to the DSP 40 for further processing. The ADC 30 may part of a digital front end (DFE) circuit of the MMIC 100 that includes additional circuitry that performs digital processing on the digital signal before outputting the digital signal y(k) from the MMIC 100 as the digital radar data.

The digital signal y(k) is representative of the radar data received in the RF signal $y_{RF}(t)$ and is further output from the digital data output terminal $D_{OUT}$ as a digital output signal, and provided to the DSP 40 that is external to the MMIC 100.

The overall system is controlled by a system controller 50 (e.g., a microcontroller), which may be at least partly implemented using a processor executing appropriate firmware. The processor may be included, e.g., in a microcontroller, a digital signal processor, or the like. The DSP 40 may be part of the system controller 50 or separate therefrom. The signal processor and system controller may be integrated in an application specific integrated circuit (ASIC). The DSP 40 may be configured to receive the digital radar data in the digital signal y(k) and process the digital radar data using the ramp parameters (e.g. respective ramp start frequencies, the respective ramp stop frequencies, a bandwidth of the first frequency range, a ramp start time, or a sampling start time) used to generate the respective frequency ramps of the RF signal $y_{RF}(t)$ in order to generate a range doppler map, which may then be further used by the DSP 40 for object detection, classification, and so on.

While the RF frontend 10 and the analog baseband signal processing chain 20 (and optionally the ADC 30) may be integrated in a single MIMIC, the components shown in FIG. 3 may be distributed among two or more integrated circuits. Particularly, some parts of the digital signal processing may be done in the MMIC 100.

Figure 4:
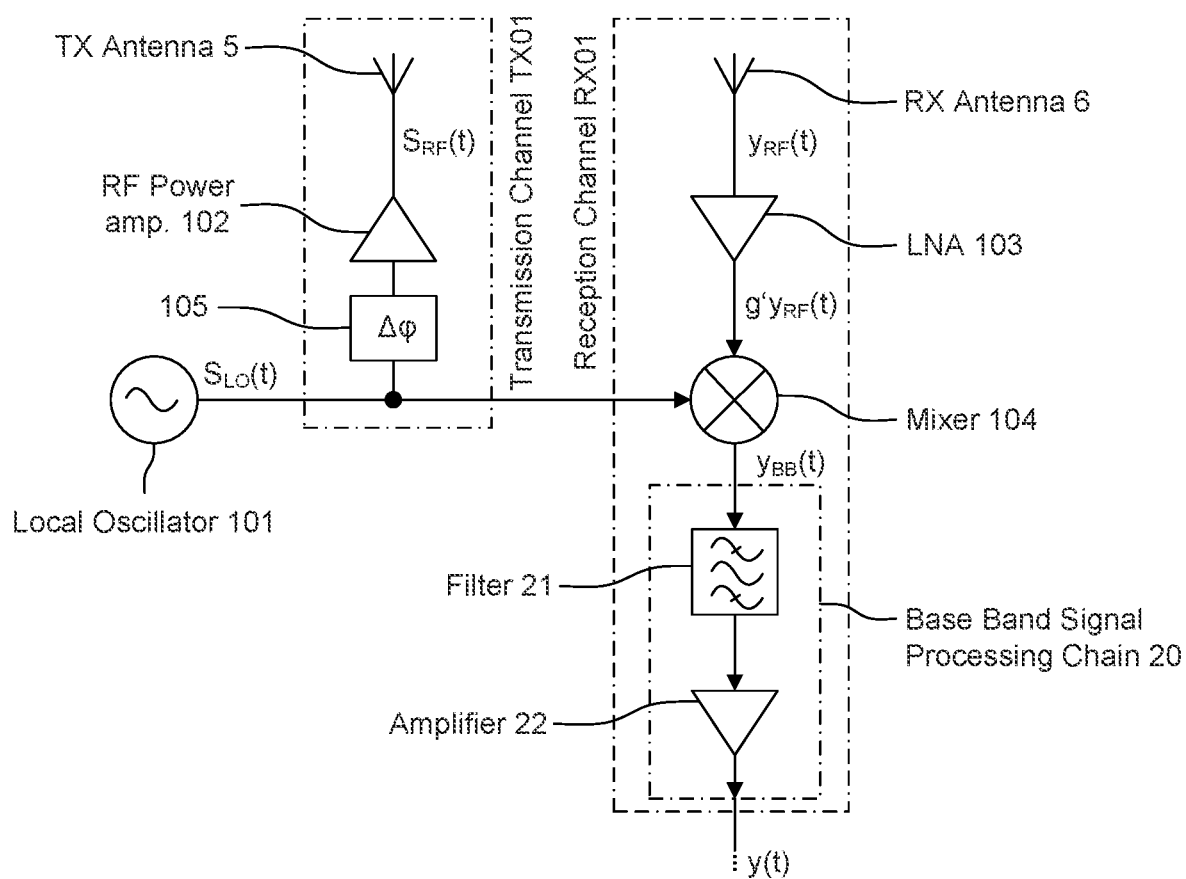
FIG. 4 is a circuit diagram illustrating one example of an analog RF frontend, which may be included in the FMCW radar device of FIG. 3 according to one or more embodiments.

FIG. 4 illustrates one exemplary implementation of the RF frontend 10, which may be included in the radar sensor 1 shown in FIG. 3. It is noted that FIG. 4 is a simplified circuit diagram illustrating the basic structure of the RF frontend. Actual implementations, which may heavily depend on the application, are of course more complex and include several RX and/or TX channels. The RF frontend 10 includes a transmission channel TX01 and a reception channel RX01. While only one transmission channel and one reception channel are shown, the MIMIC 100 may include multiple transmission channels and/or multiple reception channels with similar components.

The RF frontend 10 includes a local oscillator (LO) 101 that generates an RF signal $S_{LO}(t)$, which may be the frequency-modulated ramp signal as explained above with reference to FIG. 2 having a modulated frequency $f_{LO}(t)$. For this reason, the local oscillator 101 may also be referred to as a ramp signal generator. The RF signal $S_{LO}(t)$ is also referred to as LO signal or a reference signal. In radar applications, the LO signal is usually in the SHF (Super High Frequency) or the EHF (Extremely High Frequency) band, e.g., between 76 GHz and 81 GHz in automotive applications. The LO signal may also be generated at a lower frequency and then up-converted using frequency multiplication units. The local oscillator 101 may be part of a phase-locked loop (PLL) circuit from which the RF signal $S_{LO}(t)$ is output.

The LO signal $S_{LO}(t)$ is processed in the transmission signal path as well as in the receive path (i.e., in the transmission and reception channels). The transmission signal $S_{RF}(t)$ (outgoing radar signal), which is radiated by the TX antenna 5, is generated by amplifying the LO signal $S_{LO}(t)$, e.g., using an RF power amplifier 102. The transmission channel may also include a phase shifter 105 for applying a phase shift $\Delta\varphi$ to the LO signal $S_{LO}(t)$. For example, the phase shifter 105 may be used to manipulate the overall phase lag caused by the transmission channel. The output of the RF power amplifier 102 is coupled to the TX antenna 5. The power level of the RF power amplifier 102 may be set and adjusted by a controller of the MMIC 100. For example, by setting the power level of the RF power amplifier 102, the transmit power of the transmission channel may be set to a transmission power while the local oscillator 101 generates the transmission signal $S_{RF}(t)$ with the frequency ramps intended to be received as back-scattered signal $y_{RF}(t)$ for the processing of radar data. Alternatively, the transmit power of the transmission channel may be set to zero or to a reduced power level significantly lower than the transmission power via setting the power level of the RF power amplifier 102 accordingly. By doing so, the transmission channel is effectively turned off or substantially turned off so that little to no signal is received by the MMIC 100 via back-scattering.

The received signal $y_{RF}(t)$ (incoming radar signal), which is provided by the RX antenna 6, is directed to a mixer 104, which may be an LNA mixer. In the present example, the received signal $y_{RF}(t)$ (i.e., the antenna signal) is pre-amplified by RF amplifier 103 (gain g), so that the mixer receives the amplified signal $g \cdot y_{RF}(t)$ at its RF input port.

The mixer 104 further receives the LO signal $S_{LO}(t)$ at its reference input port and is configured to down-convert (e.g., demodulate) the amplified signal $g \cdot y_{RF}(t)$ into the baseband. In this case, it is converted into the baseband and the resulting baseband signal at the mixer output is denoted as $y_{BB}(t)$. In the present example, the mixer 104 down-converts the RF signal $g \cdot y_{RF}(t)$ (amplified antenna signal) into the baseband. The respective baseband signal (mixer output signal) is denoted by $y_{BB}(t)$. The down-conversion may be accomplished in a single stage (i.e., from the RF band into the baseband) or via one or more intermediate stages.

The baseband signal $y_{BB}(t)$ is further processed by the analog baseband signal processing chain 20 (see also FIG. 3), which basically includes one or more filters (e.g., a band-pass 21) to remove undesired side bands and image frequencies as well as one or more amplifiers, such as amplifier 22. The analog output signal of the baseband signal processing chain 20 is denoted as y(t) and may be supplied to an ADC 30 (see also FIG. 3). The digital signal y[k] output by the ADC 30 is referred to as digital radar signal that includes the digital radar data. It is understood that the digital radar signal is partitioned into frames that correspond to the chirp frames of the LO signal $s_{LO}(t)$, and each frame of the digital radar signal can be subdivided into a plurality of segments corresponding to the plurality of chirps in the corresponding chirp frame. One data acquisition (e.g., one measurement process) uses the acquisition of one frame of digital radar data, wherein the data acquisition is repeated at a defined (frame) repetition rate. The digital radar signal (e.g., frame-by-frame) may be supplied to a processor such as digital signal processor 40, which is programmed to further process the digital radar signal, e.g., by applying algorithms summarized as Range/Doppler processing. Various techniques for the digital post-processing of the digitized output signals (digital radar signal) are as such known (e.g., Range Doppler Analysis) and thus not further explained herein.

Figure 5:
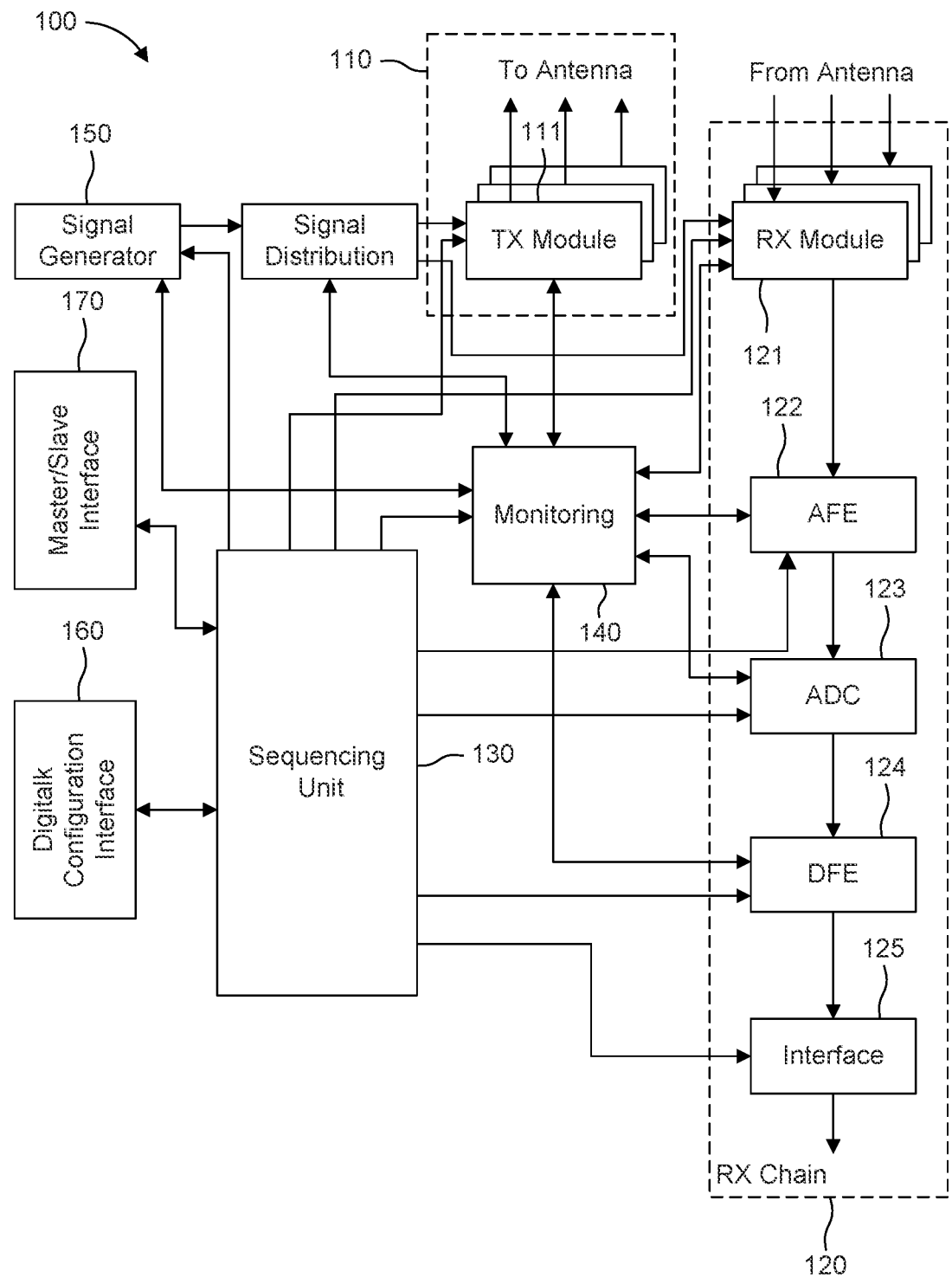
FIG. 5 shows a schematic block diagram of an MMIC in more detail according to one or more embodiments.

FIG. 5 shows a schematic block diagram of the MMIC 100 in more detail according to one or more embodiments. The MMIC 100 includes at least one transmit (TX) channel 110 for radar signals and/or at least one receive (RX) channel 120 for radar signals. The MMIC 100 can thus be regarded as part of a radar sensor or part of a radar system. The transmit channel 110 comprises one or more circuit components, such as power amplifier 102, and is configured to generate one or more radar transmission signals and to output the latter to one or more antennas. As indicated in FIG. 5, the transmit channel 110 can comprise one or more transmitters 111. The receive channel 120 comprises one or more circuit components and is configured to receive and process one or more radar reception signals received from one or more antennas. As indicated in FIG. 5, the receive channel 120 can comprise one or more receivers 121, an analog front-end 122, an ADC 123 (representative of ADC 30), a digital front-end 124, and an interface 125 that may provide a digital baseband signal to the DSP 40.

Furthermore, MMIC 100 comprises a sequencing circuit 130 configured centrally to determine a sequencing scheme for (e.g., all) time-dependent functions of the transmit channel 110 and/or of the receive channel 120 and also to drive circuit elements of the transmit channel 110 and/or of the receive channel 120 in accordance with the sequencing scheme. A time-dependent function of the transmit channel 110 and/or of the receive channel 120 is a function which is to be performed or carried out in a manner temporally coordinated or synchronized with other time-dependent functions of the transmit channel 110 and/or of the receive channel 120 in order to ensure correct operation of the radar sensor or radar system. Accordingly, the sequencing scheme represents the temporally coordinated or synchronized order of performance of the individual time-dependent functions.

By way of example, the time-dependent functions can comprise a function of the transmit channel 110 relating to generating a radio-frequency radar transmission signal, a function of the receive channel 120 relating to processing a radio-frequency radar reception signal, a monitoring function for one or more circuit components of the transmit channel 110 and/or of the receive channel 120, and/or a monitoring function for a signal processed by the transmit channel 110 and/or the receive channel 120.

The sequencing circuit 130 can be implemented for example as a dedicated circuit or a circuit for executing software in conjunction with associated implemented software configured to determine a sequencing scheme and to drive circuit elements of the transmit channel 110 and/or of the receive channel 120 in accordance with the sequencing scheme.

Radar operation of the at least one transmit channel 110 situated on the MMIC 100 and/or of the at least one receive channel 120 situated on the MIMIC 100 is controlled centrally by the sequencing circuit 130 arranged on the MMIC 100. Accordingly, the radar operation on the MIMIC 100 can be performed substantially autonomously, i.e., independently of external controllers, on account of the sequencing circuit 130.

The MIMIC 100 can be used for example for a (phase- or frequency-) modulated continuous-wave radar system. Accordingly, the transmit channel 110 and/or the receive channel 120 can be part of a modulated continuous-wave radar system, for example of an FMCW radar in the automotive field. The sequencing circuit 130 can accordingly be understood as a central sequencing unit which can coordinate all time-critical functions of the automotive FMCW radar front-end, such that a radar operation is an autonomous process which for example does not necessitate the participation of an external processor. In comparison with systems in which the synchronization of functions is distributed via a plurality of chips (e.g., a central microcontroller chip for controlling and/or for reconfiguring monitoring functions and also a phase-locked loop chip for providing a desired frequency profile), the development outlay can be lower. On account of the autonomous radar operation of the MIMIC 100, a load for a main processor of a radar sensor or of a radar system can be reduced and a higher flexibility can be achieved. Furthermore, a very high synchronism (e.g., greater than in customary processors) can be made possible on account of the possibility for the specific design of the sequencing circuit 130.

In addition to controlling a desired frequency profile of a radar transmission signal, the sequencing circuit 130 shown in FIG. 5 can control various other aspects (i.e., other control parameters) of a radar sensor or radar system in a synchronized manner. By way of example, in the transmitter 111, a power amplifier 102 can be switched on and off in a synchronized manner or a phase shift of radar transmission signals via a phase shifter can be carried out in a synchronized manner. The monitoring of the transmit channel 110 and/or of the receive channel 120 can be carried out by means of a monitoring circuit 140. The latter can accordingly be driven by the sequencing circuit 130 to trigger or to activate or to deactivate a monitoring function in a synchronized manner in accordance with the sequencing scheme. By way of example, monitoring functions can be activated or deactivated in a synchronized manner during ramp formation, a calibration (e.g., amplification of a voltage-controlled oscillator), a cascaded operation or a configuration of external components or slaves (e.g., Serial Peripheral Interface (SPI) or demultiplexing (DMUX)).

A signal generating circuit 150 may include local oscillator 101. In the signal generating circuit 150, in a synchronized manner, for example, the bandwidth of a phase-locked loop (PLL) can be set (e.g., charge pump current) or more extensive modulation concepts can be activated or deactivated (e.g., 2-point modulation, resetting current). Likewise, in a synchronized manner, for example, loop filter reset circuits can be activated or deactivated or monitoring functions can be activated or deactivated. Moreover, in a synchronized manner, by way of example, voltages can be roughly set, calibration parameters (e.g., offset current, anti-backlash, amplification of a voltage-controlled oscillator) can be set or a signal source (e.g., when using a plurality of PLLs) can be selected.

In the receiver 121, in a synchronized manner, by way of example, digital or analog filters can be set (resetting, configuration, bypass, etc.) or decimation rates can be set. Low Voltage Differential Signaling (LVDS) modes, data transmission modes, meta data transmission modes, or calibrations can be chosen in a synchronized manner. Likewise, in a synchronized manner, the receive channel 120 can also be activated or deactivated in its entirety or a reception frame delay can be set. By way of example, the ADC 123 can also be configured, calibrated, activated, or deactivated in a synchronized manner.

Likewise, general purpose inputs/outputs (GPIOs) can be configured in a synchronized manner, circuit components for generating frequency ramps can be triggered or diverse circuit components (e.g., ADC 123) can be switched on or off. Moreover, interrupts can be generated or other chip functionality can be triggered.

In order to synchronize the time-dependent functions presented by way of example above, the sequencing circuit 130 can comprise an instruction-processing unit (not shown), such as a microprocessor, with a specific instruction set for determining the sequencing scheme. The instruction set can describe the configuration flow over time and be for example similar to the instruction set of a general purpose processor. By way of example, the instruction set can comprise first specific instructions for the configuration of the circuit elements of the transmit channel 110 and/or of the receive channel 120 and also second specific instructions for the configuration of frequency parameters of a radio-frequency radar transmission signal generated by the transmit channel 110. The sequencing circuit 130 may read the instruction set from an on-chip memory via a digital configuration interface 160.

Sequencing circuit 130 can thus be understood as a radar-specific sequencing unit having an instruction set associated with a specific purpose in order to handle time-critical configurations in a highly integrated radar chip.

The master/slave interface 170 shown in FIG. 5 can additionally be used to control or supervise further radar chips in a cascading of a plurality of chips.

Some implementations described herein provide a radar device with a sequencing circuit 130 in which functionality is split between a decoder and a set of first-in first-out (FIFO) buffers. However, it is noted that the array-based instruction set is independent of whether the design is partitioned with respect to real-time requirements using FIFO buffers. In some implementations, the decoder reads a program (e.g., a specific instruction set including a set of opcodes associated with operating the radar device) from a memory of the radar device, and generates a control value and a timestamp based at least in part on the program. Here, the control value is a value that is to be provided as an input to a component of the radar device at a time indicated by the timestamp. The component may be any on-chip component, including but not limited to the transmit channel 110, the receive channel 120, the monitoring circuit 140, the signal generator 150, and respective subcomponents 101-104, 21, 22, 111, 121, 122, 123, 124, etc.

The control value (and, optionally, the timestamp) are stored by a FIFO buffer associated with the component, and the FIFO buffer provides the control value as the input to the component of the radar device at the time indicated by the timestamp. Additional details are provided below.

Figure 6:
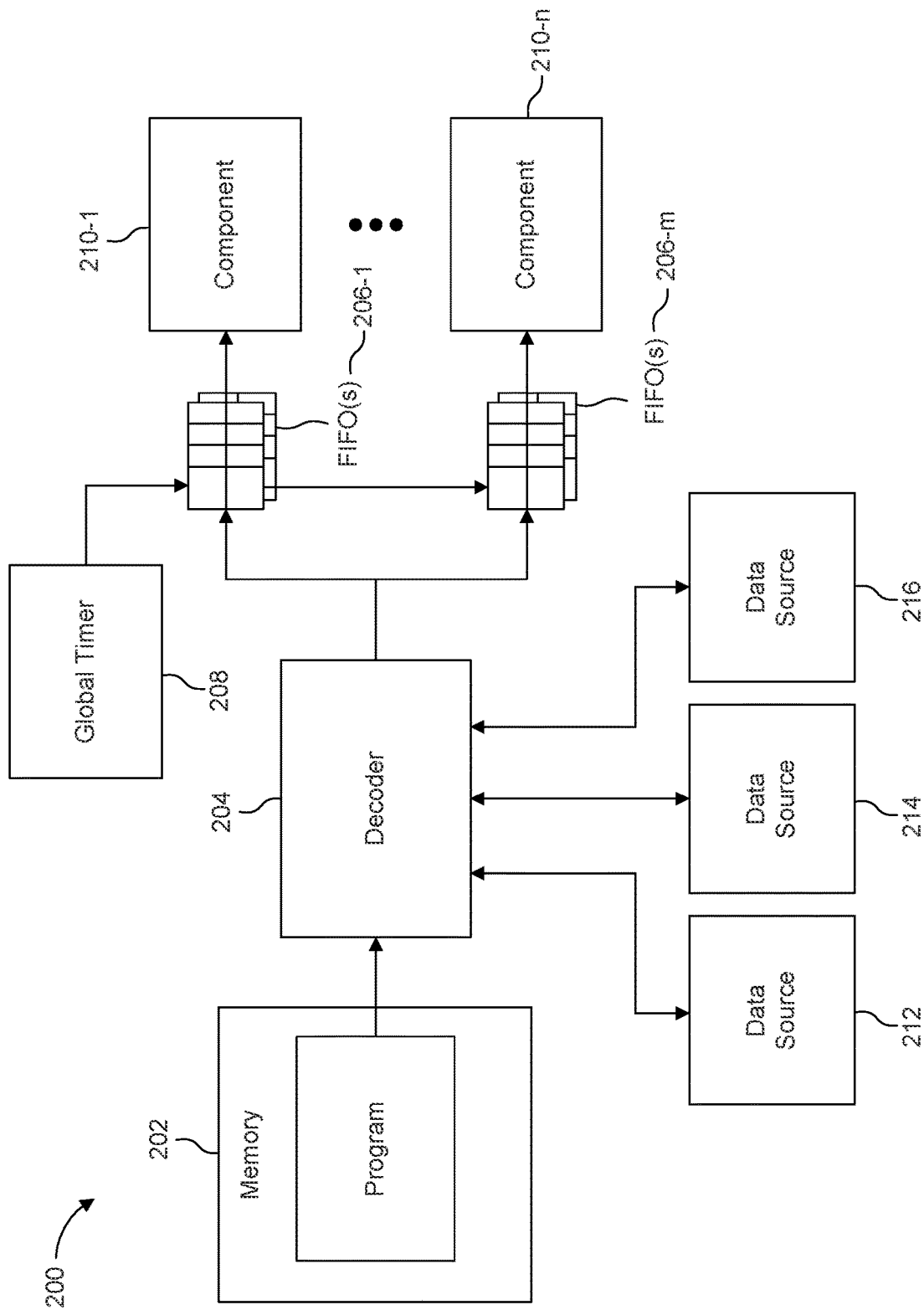
FIG. 6 is a schematic block diagram associated with a radar device in which sequencer functionality is split between a decoder and a set of first-in first-out (FIFO) buffers according to one or more embodiments.

FIG. 6 is a schematic block diagram associated with a radar device 200 in which sequencer functionality is split between a decoder and a set of FIFO buffers according to one or more embodiments. As shown in FIG. 6, the radar device 200 may include a memory 202, a decoder 204, a set of FIFO buffers 206-1 through 206-$m$ (m≥1), and a set of components 210-1 through 210-$n$ (n≥1). In some implementations, the radar device 200 is included in a radar system associated with generating, transmitting, and/or receiving radar signals. In some implementations, the radar device 200 is implemented as MMIC 100 on a single integrated circuit. Alternatively, in some implementations, the radar device 200 is implemented across two or more integrated circuits. For example, in some implementations, a first set of components of the radar device 200 may be implemented on a first integrated circuit, while a second set of components of the radar device 200 may be implemented on a second integrated circuit.

Memory 202 stores a program (also referred to as a sequencing program) associated with operation of the radar device 200, as described herein. The program is stored in a predefined area of the memory 202. In other words, a defined portion of the memory 202 is allocated to the instruction set that makes up the program. In some implementations, memory 202 may include, for example, a random access memory (RAM), a read only memory (ROM), and/or another type of memory (e.g., a flash memory, a magnetic memory, and/or an optical memory). In some implementations, the program includes one or more opcodes based on which one or more components 210-1 through 210-$n$ of the radar device 200 are to operate (e.g., in association with transmitting or receiving a sequence of frequency ramps). In some implementations, the program is to be decoded by decoder 204 so that the decoder 204 can generate value pairs (e.g., a control value and associated timestamp) associated with controlling components 210-1 through 210-$n$ of the radar device 200, as described below.

Decoder 204 is a component that reads the program from the memory 202 and extracts control values therefrom associated with controlling a parameters of one or more components 210-1 through 210-$n$. Additionally, the decoder is configured to read the program from the memory 202 and access one or more data sources 212, 214, and 216 for retrieving data values therefrom that are then used to derive corresponding control values associated with controlling a parameters of one or more components 210-1 through 210-*n*. The data sources 212, 214, and 216 are external to the program itself, meaning that they are not located in the defined portion of the memory 202 that is allocated to the instruction set that makes up the program. As a result, data values stored in any of the data sources 212, 214, and 216 are not stored within the program and do not exist explicitly within the program's instruction code. Instead, the program's instruction code provides a means to indirectly access the externally stored data values. In contrast, other data values, such as data value value1 are explicitly stored within the program's instruction code.

For example, one or more data sources 212, 214, and 216 may be a memory array that stores a respective data values that is accessible, for example, via an array index indexed by the program. The memory array may be a register array, an area of RAM, or the like. While the memory array is located external to the portion of memory 202 that stores the program, the memory array may be provided in a different part of memory 202 (e.g., in a different memory area from the memory area that stores the program), may be provided in another on-chip memory device separate from memory 202, or may be a memory that is external to MMIC 100 (i.e., located "off-chip"). Thus, the memory array and the defined portion of the memory 202 that is allocated to the instruction set that makes up the program are mutually exclusive memory areas. The data sources 212, 214, and 216, if implemented as memory arrays, may be provided as different, mutually exclusive memory areas of a same memory device (e.g., memory 202) and/or may be provided as different memory devices.

Alternatively, one or more data sources 212, 214, and 216 may be data generator that sequentially generates data values when prompted by the decoder. A data generator may be a pseudo random number generator (PRNG) or a true random number generator (RNG) that sequentially generates random data values when prompted by the decoder 204, with a new random data value being provided each time the data generator is accessed by the decoder 204. Alternatively, one or more data sources 212, 214, and 216 may be another type of data value storage device or data value generator, such as an accumulator with and without modulo operation.

In either case, each data source 212, 214, and 216 is associated with a respective control parameter of a component. Alternatively, a same data source may be used for two or more control parameters. For example, a different area of a memory array may be used by a second control parameter by referencing a different starting index value than one used by a first control parameter. In other words, different sets of memory arrays may be allocated to different control parameters via indexing. Thus, each control parameter whose control value is derived from an external data source has a respective data source assigned thereto.

In some cases, depending on the program, a data value received from a data source can be converted directly into the control value without additional calculations. Here, the decoder 204 can convert the data value into the control value for the control parameter. In other cases, depending on the program, a data value received from a data source can be converted indirectly into the control value by additional calculations. For example, the program may explicitly define a base value for the control parameter and from which a control value is derived using the base value and the data value received from the data source. In this case, the decoder 204 is configured to extract the base value from sequencing program, access the data value from the data source specified by the program, and derive the control value from the base value and the data value. For example, the data value may be a positive or negative offset value that is added or subtracted from the base value by the decoder 204 to derive the control value. Alternatively, the data value may be added or subtracted from a previous control value to generate a new control value.

The control parameters may include ramp parameters associated with generating a sequence of frequency ramps of a frequency-modulated ramp signal (i.e., associated with generating the frequency profile of a radar transmission signal), such as the start frequency $f_{START}$, the stop frequency $f_{STOP}$, the frequency difference $f_{DIFF}$, the ramp time interval $T_{CHIRP}$, the wait time interval $T_{WAIT}$, the base frequency $f_{BASE}$, a frequency offset $f_{OFFSET}$, and a transmission phase $\Delta\varphi$. Additionally, the control parameters may be control settings for any other component described, for example, in conjunction with FIG. 5.

The decoder 204 may be configured to generate a value pair comprising a control value and a timestamp associated with the control value based at least in part on the program (e.g., by decoding the program). Again, a control value is a value to be provided as an input to one of the components 210-1 through 210-*n* of the radar device 200 at a time indicated by the timestamp associated with the control value. As shown in FIG. 6, the decoder 204 may be configured such that the decoder 204 can provide at least the control value (and optionally the associated timestamp) to a FIFO buffer 206 associated with one of the components 210-1 through 210-*n* to be controlled using the control value.

In some implementations, as described in further detail below, the use of the FIFO buffers 206 enables the decoder 204 to only need to fulfill soft real-time requirements. That is, as long as the decoder 204 can decode the program fast enough (relative to execution of the frequency ramp scenario) on average to generate value pairs, sufficiently large FIFO buffers 206 allow the radar device 200 to guarantee the hard real-time requirements. Here, because the decoder 204 needs only to fulfill soft real-time requirements, the decoder 204 can in some implementations be implemented at least partially in software.

One advantage of at least partial implementation of the decoder 204 in software is that any changes or bugs in components 210-1 through 210-*n* can be fixed in the software. For example, in an example case a gain of a component in the form of a power amplifier is programmed to change from 0 to a given value at a particular point in time. That is, in an example case the program requires a single value pair to be pushed to the FIFO buffer 206 for the gain input of the power amplifier. Further, in this example case, due to a bug in the design, changing the gain of the power amplifier in one step causes a significant supply load step and therefore should be avoided, if possible. In this case, the software of the decoder 204 that decodes the program could be used to insert a "ramping" of the gain by pushing several value pairs. Notably, the program stored in memory 202 would be unaffected by this change.

Another advantage of at least partial implementation of the decoder 204 in software is that additional FIFO buffers 206 can be included in the radar device 200 for enabling additional configurations of the radar device 200. These additional configurations could be either inserted into previously unused or reserved parts of the program, or even derived from other given configurations. For example, assume a power amplifier of the radar device 200 has a bug that makes changing a gain impossible while the power amplifier is turned on. Here, if a FIFO buffer 206 is available for a signal used to enable/disable the power amplifier, then for each value pair pushed to the FIFO buffer 206 associated with the gain of the power amplifier, the software can also push the value pairs to the associated FIFO buffer 206, which could be used to disable the power amplifier to change the gain, and to re-enable the power amplifier after changing the gain. Again, no changes to the program are necessary to provide such a configuration.

Thus, in some implementations, the decoder 204 is implemented at least partially in software, where the decoder 204 may be a combination of a software-based decoder and a hardware-based decoder (i.e., the decoder 204 may be implemented in both software and hardware). Notably, when the decoder 204 is implemented as a combination of a software-based decoder and a hardware-based decoder, the benefits of software (e.g., flexibility) and hardware (e.g., speed) may both be provided to some degree. Alternatively, in some implementations, the decoder 204 is a hardware-based decoder (i.e., the decoder 204 may be implemented purely in programmable hardware). Notably, requirements of the decoder 204 are reduced when the decoder 204 is a hardware-based decoder (e.g., a programmable processor), thereby allowing a comparatively more efficient hardware implementation. In other words, a purely hardware implementation of the sequencing program provides the fastest and most efficient approach for real-time data processing.

Returning to FIG. 6, the FIFO buffer 206-1 through 206-m store at least a control value and to provide the control value as the input to its respective component 210-1 to 210-n of the radar device 200 at a time indicated by a timestamp associated with the control value. That is, the FIFO buffer 206 is a component of the radar device 200 that holds control values to be provided to its respective component of the radar device 200 and provides the control values to the component at appropriate times during operation of the radar device 200. In some implementations, the FIFO buffer 206-1 through 206-m stores the control values and the associated timestamps as value pairs (e.g., such that a control value is associated with a corresponding timestamp within the FIFO buffer 206). Alternatively, in some implementations, the FIFO buffer 206 may store the control values only. For example, the FIFO buffer 206 may store the control values, and timestamps associated with the control values may be stored external to the FIFO buffer 206. In such a case, the radar device 200 may include a triggering component that stores timestamps associated with multiple FIFO buffers 206. Here, the triggering component may, upon determining that a value of the global timer 208 has reached a first timestamp, provide a trigger signal that causes one or more of the multiple FIFO buffers 206 to provide respective control values to their associated components 210-1 to 210-n. Such an implementation can be used to eliminate a need to store multiple instances of the same timestamp, thereby reducing an amount of memory needed in the radar device 200, meaning that a size and/or cost of the radar device 200 is reduced.

As shown in FIG. 6, the radar device 200 may include one or more FIFO buffers 206 for each component 210-1 to 210-n of the radar device 200. That is, the radar device 200 may include one or more FIFO buffers 206 for providing control values to a given component 210-1 to 210-n of the radar device 200. Notably, in the radar device 200, the FIFO buffer 206 needs to fulfill hard real-time requirements. That is, the FIFO buffer 206 needs to fulfill hard real-time requirements in terms of providing control values as inputs to components 210-1 to 210-n in a cycle-accurate manner.

Figure 7:
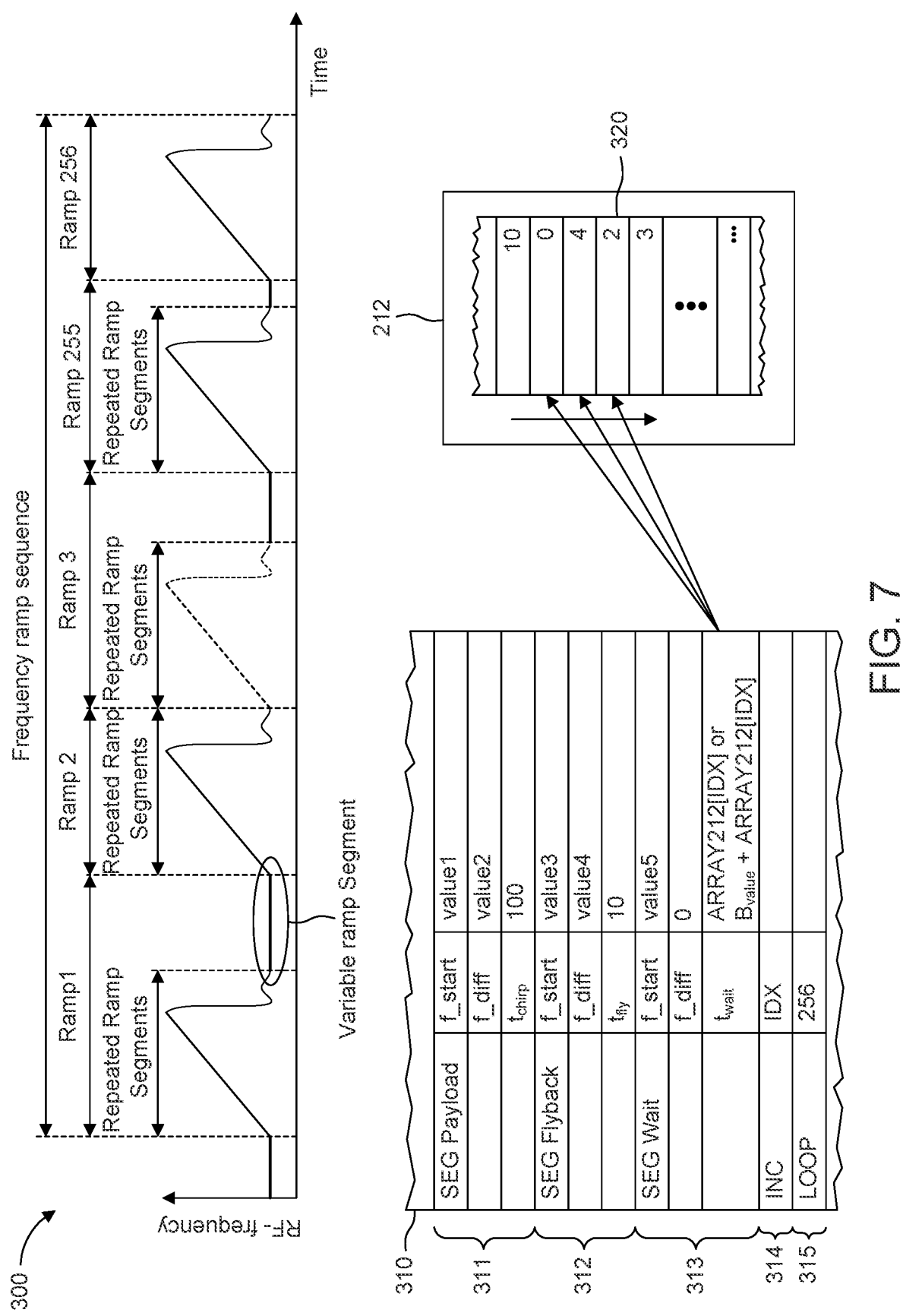
FIG. 7 illustrates an example of a frequency-modulated ramp signal comprising a plurality of frequency ramps generated according to a portion of a sequencing program and indirect accesses to an external data source according to one or more examples.

FIG. 7 illustrates an example of a frequency-modulated ramp signal 300 comprising a plurality of frequency ramps generated according to a portion of a sequencing program 310 and indirect accesses to an external data source 212 according to one or more examples. Each ramp of the frequency-modulated ramp signal 300 is generated according to a plurality of ramp parameters. In particular, each ramp includes a payload segment (SEG payload), a flyback segment (SEG flyback), and a wait segment (SEG wait), each of which controlled by a respective opcode segment 311, 312, and 313 of the sequencing program 310. The opcode segments 311, 312, and 313 could be the same opcode with different respective parameter values defined or could be different opcodes.

In this example, the payload segment (SEG payload) and the flyback segment (SEG flyback) are fixed for a sequence of 256 frequency ramps in accordance with loop opcode segment 315. Additionally, the wait segment (SEG wait) is a variable ramp segment that varies in accordance with external data values stored in external data source 212 that is accessed by the decoder 204 in accordance with the sequencing program 310. The 256 frequency ramps make up a radar frame of the frequency-modulated ramp signal 300. While in the present example the variable ramp segment changes on a ramp-by-ramp basis (i.e., the decoder is configured to request a data value from the specified data source for each frequency ramp), the decoder 204 may be programmed to request data values from data sources on a ramp segment-by-ramp segment basis, a ramp-by-ramp basis, a subframe-by-subframe basis, a frame-by-frame basis, or a combination thereof. Any type of programmable loop or nested loop is possible.

The opcode segment 311 defines control values for the payload segment (SEG payload) that are extracted by the decoder 204 and used as control inputs to the signal generator 150 for controlling respective control parameters (i.e., ramp parameters). In this case, the opcode segment 311 defines a fixed control value (value1) for the start frequency $f_{START}$ of the payload segment, a fixed control value (value2) for the frequency difference $f_{DIFF}$ of the payload segment, and the ramp time interval $t_{CHIRP}$ of the payload segment (e.g., 10 μms). Thus, each payload segment of the 256 frequency ramps has a payload segment defined by these three ramp parameters. The decoder 204 is configured to read the sequencing program from the memory, extract the control values defined in the sequencing program for the frequency ramps, and provide the control values to the ramp signal generator 150 in the manner described above.

Similarly, the opcode segment 312 defines control values for the flyback segment (SEG flyback) that are extracted by the decoder 204 and used as control inputs to the signal generator 150 for controlling respective control parameters (i.e., ramp parameters). In this case, the opcode segment 312 defines a fixed control value (value3) for the start frequency $f_{START}$ of the flyback segment, a fixed control value (value4) for the frequency difference $f_{DIFF}$ of the flyback segment, and the flyback time interval $t_{FLY}$ of the payload segment (e.g., 10 ms). Thus, each flyback segment of the 256 frequency ramps has a flyback segment defined by these three ramp parameters. The decoder 204 is configured to read the sequencing program from the memory, extract the control values defined in the sequencing program for the frequency ramps, and provide the control values to the ramp signal generator 150 in the manner described above.

The opcode segment 313 defines control values for the wait segment (SEG wait) that are extracted by the decoder 204 and used as control inputs to the signal generator 150 for controlling respective control parameters (i.e., ramp parameters). In addition, the opcode segment 313 specifies a data source and an index value for accessing data values that are to be provide by the data source. In this example, the opcode segment 313 defines a fixed control value (value5) for the start frequency $f_{START}$ of the wait segment, a control value (0) for the frequency difference $f_{DIFF}$ of the wait segment (i.e., the frequency of the ramp signal remains constant during the wait interval). Being fixed values defined by the program, each wait segment of the 256 frequency ramps has a wait segment defined by these two ramp parameters.

In addition, the opcode segment 313 selectively specifies data source 212 (ARRAY212) and an index value (IDX) of the data source 212 from which a data value is to be accessed for the ramp parameter $t_{WAIT}$. In this case, the data source is a memory array 320. Based on this code, the decoder 204 is configured to access the data value from the memory location of the specified data source 212 that corresponds to the index value. The decoder 204 then derives a control value from the data value by either directly applying the data value as the control value (e.g., in according with code ARRAY212[IDX]) or by applying the data value as an offset value to a base value Bvalue defined in the opcode segment 313 (e.g., in according with code Bvalue+ARRAY212 [IDX]). The decoder 204 is configured provide the control value to the ramp signal generator 150 in the manner described above. Accessed data values could be positive or negative when used in conjunction with a base value defined in the program.

At the end of the ramp iteration (i.e., loop iteration), the index value IDX is incremented [INC] in accordance with opcode 314 such that the next memory location of the memory array 320 is accessed for the generation of the next frequency ramp in the sequence of frequency ramps. Accordingly, the data values stored in the memory array 320 may vary such that the ramp parameter $t_{WAIT}$ may vary from ramp to ramp in the sequence of 256 frequency ramps. It will be appreciated that operations other than incrementing are also possible. For example, decrementing is possible. Also, the increment or decrement can be different than one (e.g., one, two, or greater).

Together, the two fixed control values and the variable control value generated from data values accessed from a data source external to the program are used by the signal generator 150 to generate the wait segments for the number of frequency ramps defined by the loop opcode segment 315.

It will also be appreciated that two or more ramp parameters may be variable within the same sequence (loop) of frequency ramps by accessing a data source that stores variable data values for that control parameter. For example, ramp time interval $t_{CHIRP}$ or the ramp frequency difference $f_{DIFF}$ of the payload segment could similarly be directed to a different data source (e.g., data source 214) or a different area of the same data source 212 (e.g., a different set of memory locations) by using a different starting index value than the starting index value used for ramp parameter $t_{WAIT}$. It will also be appreciated that the number of frequency ramps set by the loop opcode segment 315 is entirely configurable, along with all other opcode segments. Nested loops may also be present within the program.

In this way, fixed ramp parameters can be reused by the same portion of code for the generation of a sequence of ramps, while also permitting the flexibility for varying one or more ramp parameters without the need to explicitly write each and every ramp parameter for each and every frequency ramp into the sequencing program. For example, opcode segments 311, 312, and 313 can be decoded as a loop instead of being written 256 times and still permit one or more ramp parameters to be varied throughout the ramp sequence. Accordingly, the proposed method provides flexibility while reducing the amount of memory needed for the sequencing program. Furthermore, since such a method can be implemented in programmable hardware, real-time implementation of variable ramp parameters within a sequence of frequency ramps can be realized by avoiding delays caused by transferring large amounts of data.

Furthermore, if a control parameter varies in a small range from a base value, then the array elements can be further packed by just using, e.g., 1 byte instead of 4 bytes for each element. Moreover, if granularity/resolution of the data value can be given up, a pre-defined shift-left operation (multiplication by a power of 2) of the data value (value from the array) associated with the data source can allow to use, e.g., 2 bytes instead of 4 bytes for each array element. Accordingly, something like OPCODE_VALUE+f(ARRAY_VALUE) could be used, where f is a configurable function (which could include bit extensions, shifts, or possibly other operations). Accordingly, the proposed method provides flexibility while reducing the amount of memory needed for the sequencing program.

Figure 8:
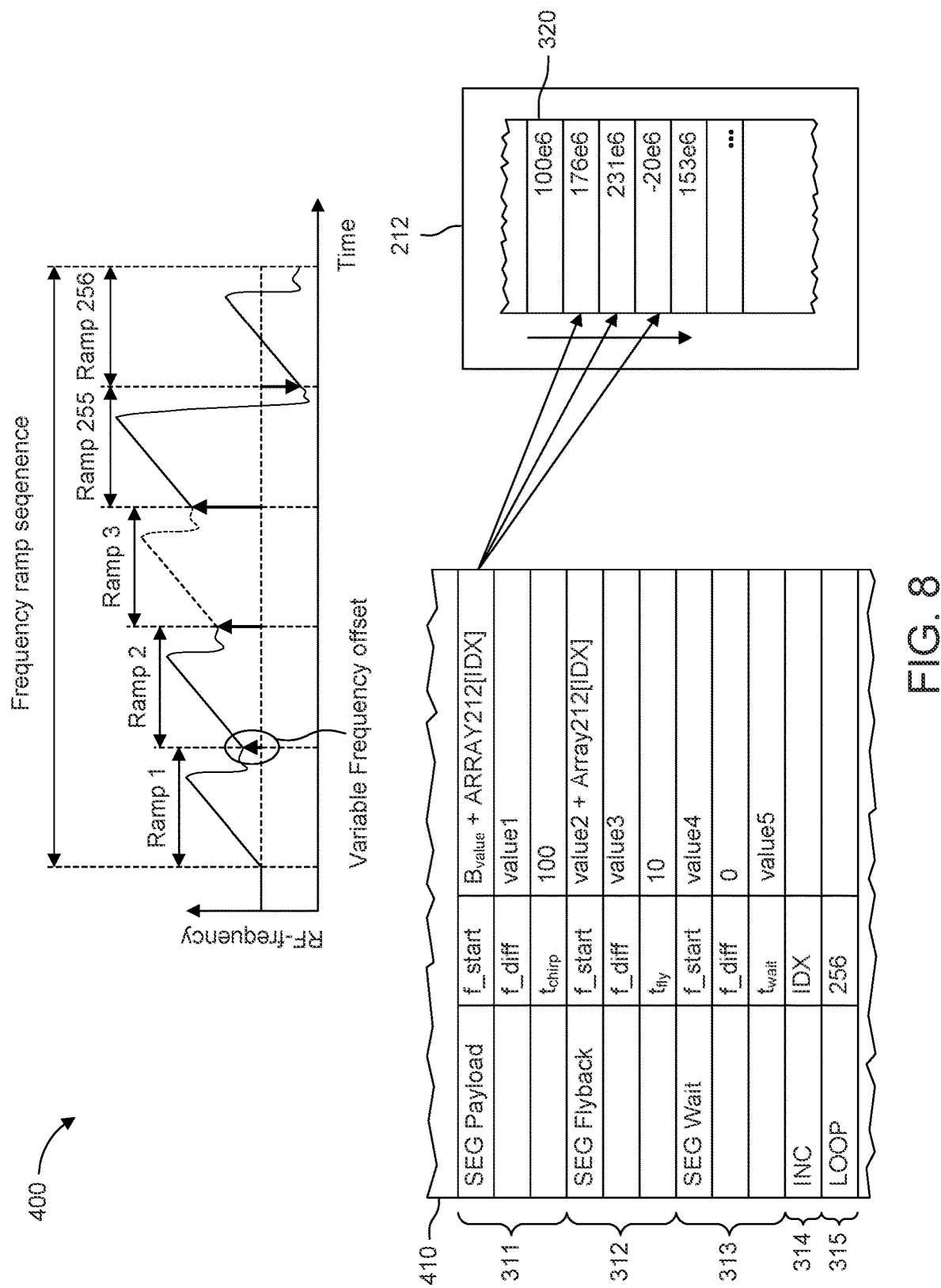
FIG. 8 illustrates an example of another frequency-modulated ramp signal comprising a plurality of frequency ramps generated according to a portion of another sequencing program and indirect accesses to an external data source according to one or more examples.

FIG. 8 illustrates an example of a frequency-modulated ramp signal 400 comprising a plurality of frequency ramps generated according to a portion of a sequencing program 410 and indirect accesses to an external data source 212 according to one or more examples. Each ramp of the frequency-modulated ramp signal 400 is generated according to a plurality of ramp parameters. In particular, each ramp includes a payload segment (SEG payload), a flyback segment (SEG flyback), and a wait segment (SEG wait), each of which controlled by a respective opcode segment 311, 312, and 313 of the sequencing program 410 in a similar manner described with respect to FIG. 7.

In this example, the start frequency $f_{START}$ of the payload segment (SEG payload) is variable according to its data access to data source 212. All other ramp parameters in this example are fixed by a predetermined value within the program (i.e., within the opcode) and are extracted therefrom by the decoder 204 for generating corresponding control values to be sent to the ramp signal generator 150.

The program 410 defines a base value Bvalue for the start frequency $f_{START}$ of the payload segment and uses data values from the data source 212 as variable offset values that are added or subtracted from the base value Bvalue to derive a control value for each frequency ramp.

Specifically, the opcode segment 311 specifies data source 212 (ARRAY212) and an index value (IDX) of the data source 212 from which a data value is to be accessed for the ramp parameter $f_{START}$. In this case, the data source is a memory array 320. Based on this code, the decoder 204 is configured to access the data value from the register of specified data source 212 that corresponds to the index value. The decoder 204 then derives the control value from the data value by applying the data value as an offset value to the base value Bvalue defined in the opcode segment 311 (e.g., in according with code Bvalue+ARRAY212[IDX]). The decoder 204 is configured provide the control value to the ramp signal generator 150 in the manner described above. Accessed data values can be positive or negative and thus added to or subtracted from the base value Bvalue to calculated different start frequencies for different frequency ramps within the sequence.

It is noted that $f_{START}$ of opcode segment 312 could be omitted, which means "just use the instantaneous frequency that was there at the end of the last segment" of it could use value2+ARRAY212[IDX], which would shift its frequency by the same offset as that used in opcode segment 311.

At the end of the ramp iteration (i.e., loop iteration), the index value IDX is incremented [INC] in accordance with opcode segment 314 such that the next register of the memory array 320 is accessed for the generation of the next frequency ramp in the sequence of frequency ramps. Accordingly, the data values stored in the memory array 320 may vary such that the ramp parameter $f_{START}$ may vary from ramp to ramp in the sequence of 256 frequency ramps.

Together, the two fixed control values written in the program and the variable control value generated from data values accessed from a data source external to the program are used by the signal generator 150 to generate the payload segments for the number of frequency ramps defined by the loop opcode segment 315.

Figure 9:
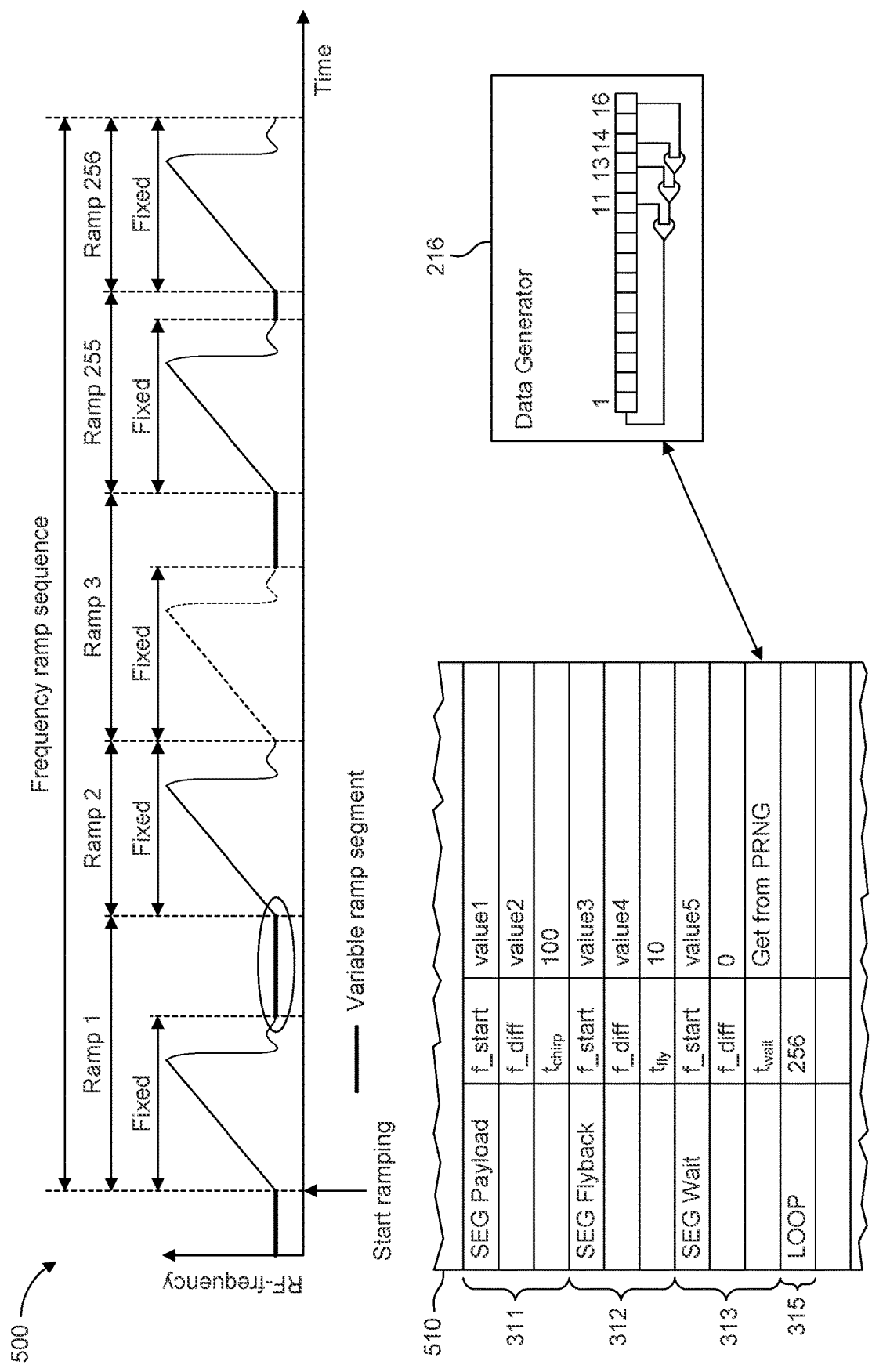
FIG. 9 illustrates an example of another frequency-modulated ramp signal comprising a plurality of frequency ramps generated according to a portion of another sequencing program and indirect accesses to an external data source according to one or more examples.

FIG. 9 illustrates an example of a frequency-modulated ramp signal 500 comprising a plurality of frequency ramps generated according to a portion of a sequencing program 510 and indirect accesses to an external data source 216 according to one or more examples. Each ramp of the frequency-modulated ramp signal 500 is generated according to a plurality of ramp parameters. In particular, each ramp includes a payload segment (SEG payload), a flyback segment (SEG flyback), and a wait segment (SEG wait), each of which controlled by a respective opcode segment 311, 312, and 313 of the sequencing program 510 in a similar manner described with respect to FIG. 7.

Similar to sequencing program 310, the wait interval $t_{WAIT}$ of the wait segment is variable with data values corresponding thereto being accessed from an external data source. However, in this example, the external data source 216 is a PRNG or some other data generator that generates data values according to a data generation algorithm. When the decoder 204 reads the code for $t_{WAIT}$, the code instructs the decoder 204 to retrieve a data value from the data source 216 PRNG. As a result, the decoder 204 prompts or triggers the data source 216 to generate a random data value and output the random data value to the decoder 204. The decoder 204 then derives the random data value by directly applying the data value as the control value to the wait interval $t_{WAIT}$ of the current frequency ramp. It is also possible for the decoder 204 to apply the random data values as offset values to a base value if defined in the opcode segment 313. Thus, the decoder 204 obtains a new data value from the data source 216 for the wait interval $t_{WAIT}$ on each ramp iteration (i.e., for each frequency ramp) in the ramp sequence.

Together, the two fixed control values written in the program and the variable control value generated from data values obtained from the data source 216 are used by the signal generator 150 to generate the wait segments for the number of frequency ramps defined by the loop opcode segment 315.

Figure 10:
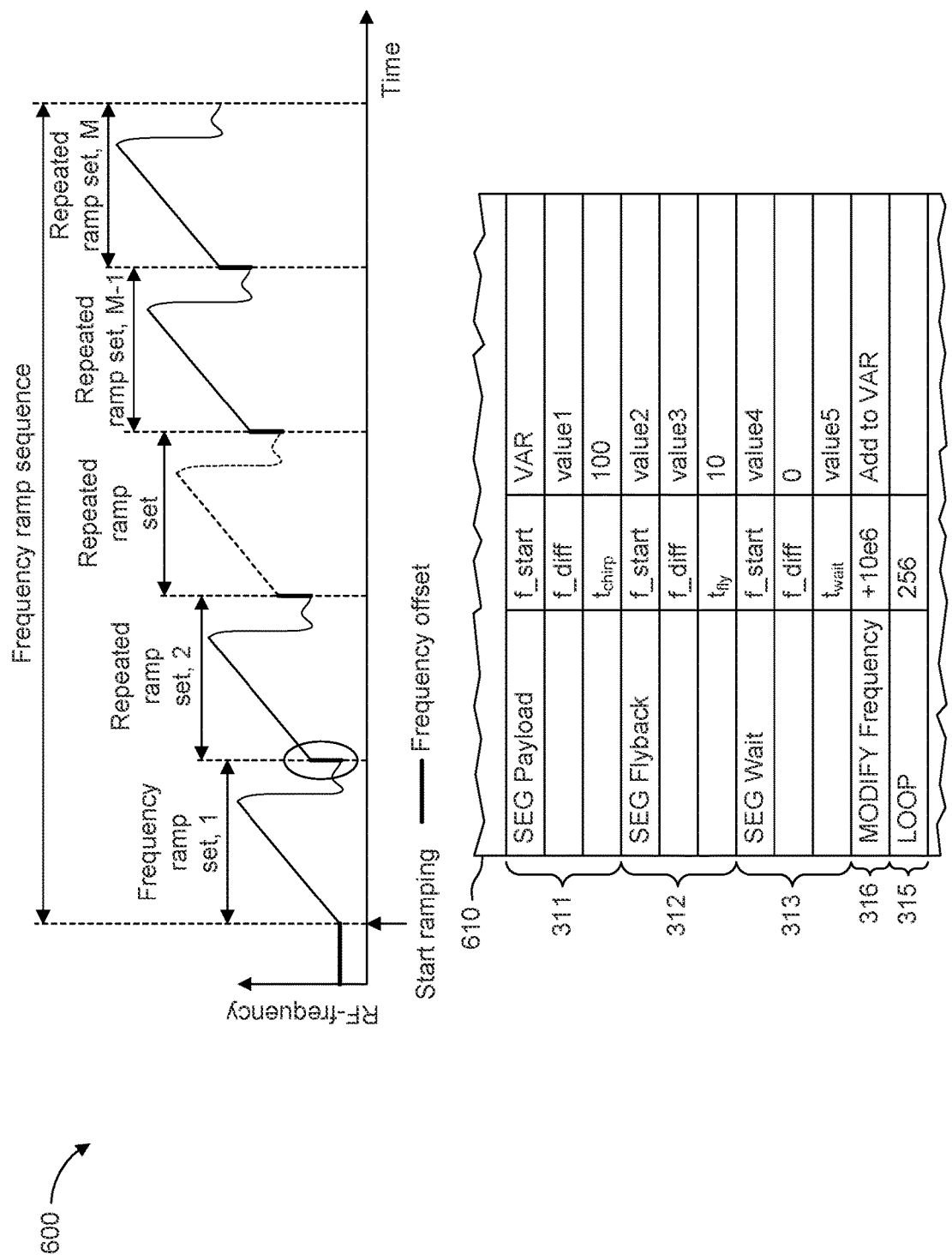
FIG. 10 illustrates an example of another frequency-modulated ramp signal comprising a plurality of frequency ramps generated according to a portion of another sequencing program that includes persistent parameter settings offsets according to one or more examples.

FIG. 10 illustrates an example of a frequency-modulated ramp signal 600 comprising a plurality of frequency ramps generated according to a portion of a sequencing program 610 that includes persistent parameter settings offsets according to one or more examples. Each ramp of the frequency-modulated ramp signal 600 is generated according to a plurality of ramp parameters. In particular, each ramp includes a payload segment (SEG payload), a flyback segment (SEG flyback), and a wait segment (SEG wait), each of which controlled by a respective opcode segment 311, 312, and 313 of the sequencing program 610 in a similar manner described with respect to FIG. 7.

As before, several of the ramp parameters are fixed by their respective control values written into the code, with the exception of the start frequency $f_{START}$ of the payload segment defined in opcode segment 311. The start frequency $f_{START}$ of the payload segment is defined by a variable VAR that is set to an initial value for the loop. The program 610 additionally includes an offset opcode segment 316 that defines an offset value (e.g., +10 e6) that, when read by the decoder 204, causes the decoder 204 to increment the variable VAR by the offset value for the next frequency ramp in the sequence of the loop. In this way, the decoder 204 calculates new control values at each ramp iteration to implement a continuous and uniform change of the start frequency $f_{START}$ of the payload segment for each subsequent ramp in the sequence. This change would also affect all other subsequent segments, including flyback and wait segments, for example. The computation is simple and does not require memory for a memory array. This feature may be used in combination with other control parameters that are derived using data access of one or more data sources.

In view of the above, a radar semiconductor chip may include a ramp signal generator configured to generate a frequency-modulated ramp signal comprising a plurality of frequency ramps, wherein the ramp signal generator is configured to generate the plurality of frequency ramps according to a plurality of ramp parameters; a memory configured to store a sequencing program associated with generating the frequency-modulated ramp signal, wherein the sequencing program defines a first control value for a first ramp parameter of the plurality of ramp parameters and specifies a first data source, external to the sequencing program, that is configured to provide a first data value corresponding to a second ramp parameter of the plurality of ramp parameters; and a decoder configured to read the sequencing program from the memory, extract the first control value for the first ramp parameter defined in the sequencing program, access the first data value from the first data source specified by the sequencing program, derive a second control value for the second ramp parameter from the first data value, and provide the first control value and the second control value to the ramp signal generator. The ramp signal generator is configured to generate a first frequency ramp of the plurality of frequency ramps having the first ramp parameter defined by the first control value and the second ramp parameter defined by the second control value.

A radar semiconductor chip may include a radar circuit component configured to generate at least part of a frequency-modulated ramp signal or process at least part of a reflected frequency-modulated ramp signal according to a control parameter; a memory configured to store a sequencing program associated with regulating the control parameter, wherein the sequencing program specifies a first data source, external to the sequencing program, that is configured to provide a first data value corresponding to the control parameter; and a decoder configured to read the sequencing program from the memory, access the first data value from the first data source specified by the sequencing program, derive a first control value for the control parameter from the first data value, and provide the first control value to the radar circuit component, wherein the radar circuit component is configured to regulate a controlled circuit function in accordance with the control parameter based on the first control value.

A radar semiconductor chip may include a ramp signal generator configured to generate a frequency-modulated ramp signal comprising a plurality of frequency ramps, wherein the ramp signal generator is configured to generate the plurality of frequency ramps according to a plurality of ramp parameters; a memory configured to store a sequencing program associated with generating the frequency-modulated ramp signal, wherein the sequencing program defines a static control value for a first ramp parameter of the plurality of ramp parameters and a dynamic control value for a second ramp parameter of the plurality of ramp parameters, wherein the dynamic control value changes on at least one of a ramp segment-by-ramp segment basis, a ramp-by-ramp basis, a subframe-by-subframe basis, or a frame-by-frame; and a decoder configured to read the sequencing program from the memory, extract the static control value for the first ramp parameter defined in the sequencing program, calculate the dynamic control value for each frequency ramp of the plurality of frequency ramps based on a previous control value and an offset control value defined by the sequencing program, and provide the static control value and the dynamic control value to the ramp signal generator. The ramp signal generator is configured to generate the plurality of frequency ramps having the first ramp parameter defined by the static control value and the second ramp parameter defined by the dynamic control value that changes on at least one of a ramp segment-by-ramp segment basis, a ramp-by-ramp basis, a subframe-by-subframe basis, or a frame-by-frame according to the offset control value.

A radar semiconductor chip may include a radar circuit component configured to generate at least part of a frequency-modulated ramp signal or process at least part of a reflected frequency-modulated ramp signal according to a control parameter; a memory configured to store a sequencing program associated with regulating the control parameter, wherein the sequencing program defines a dynamic control value for the control parameter, wherein the dynamic control value changes on at least one of a ramp segment-by-ramp segment basis, a ramp-by-ramp basis, a subframe-by-subframe basis, or a frame-by-frame basis of the frequency-modulated ramp signal; and a decoder configured to read the sequencing program from the memory, calculate the dynamic control value that corresponds to one of the plurality of frequency ramps based on a previous control value and an offset control value defined by the sequencing program, and provide the dynamic control value to the radar circuit component. The radar circuit component is configured to regulate a controlled circuit function in accordance with the control parameter based on the dynamic control value that changes on the at least one of the ramp segment-by-ramp segment basis, the ramp-by-ramp basis, the subframe-by-subframe basis, or the frame-by-frame according to the offset control value.

A method for controlling a radar circuit component of a radar semiconductor chip is provided, where the radar circuit component is configured to generate at least part of a frequency-modulated ramp signal or process at least part of a reflected frequency-modulated ramp signal according to a control parameter. The method includes storing, by a memory, a sequencing program associated with regulating the control parameter, wherein the sequencing program specifies a first data source, external to the sequencing program, that is configured to provide a first data value corresponding to the control parameter; reading, by a decoder, the read the sequencing program from the memory; accessing, by the decoder, the first data value from the first data source specified by the sequencing program; deriving, by the decoder, a first control value for the control parameter from the first data value; providing, by the decoder, the first control value to the radar circuit component for controlling the control parameter; and regulating a controlled circuit function, by the radar circuit component, in accordance with the control parameter based on the first control value.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Instructions may be executed by one or more processors, such as one or more central processing units (CPUs), digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized, and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A radar semiconductor chip, comprising:
   a ramp signal generator configured to:
      generate a frequency-modulated ramp signal comprising a plurality of frequency ramps, and
      generate the plurality of frequency ramps according to a plurality of ramp parameters;
   a memory configured to store a sequencing program associated with generating the frequency-modulated ramp signal, wherein the sequencing program specifies a first data source, external to the sequencing program, that is configured to provide a first data value corresponding to a first ramp parameter of the plurality of ramp parameters; and
   a decoder configured to:
      read the sequencing program from the memory,
      access the first data value from the first data source specified by the sequencing program,
      derive a first control value for the first ramp parameter from the first data value, and
      provide the first control value,
   wherein the ramp signal generator is further configured to generate a first frequency ramp of the plurality of frequency ramps having the first ramp parameter defined by the first control value, and
   wherein the ramp signal generator, the memory, the first data source, and the decoder are integrated on a same monolithic microwave integrated circuit (MMIC).

2. The radar semiconductor chip of claim 1, wherein:
   the first data source is further configured to provide a plurality of first data values corresponding to the first ramp parameter, and
   the decoder is further configured to:
      sequentially access the plurality of first data values from the first data source,
      derive a respective first control value for each frequency ramp of the plurality of frequency ramps based on a corresponding one of the plurality of first data values to derive a plurality of first control values, and
      provide the plurality of first control values to the ramp signal generator, and
   the ramp signal generator is further configured to generate the plurality of frequency ramps having the first ramp parameter that varies according to the plurality of first control values.

3. The radar semiconductor chip of claim 1, wherein:
   the sequencing program further specifies the first data source that is configured to provide a second data value corresponding to the first ramp parameter,
   the decoder is further configured to:
      access the second data value from the first data source,
      derive a second control value for the first ramp parameter based on the second data value, and
      provide the second control value to the ramp signal generator, and
   the ramp signal generator is further configured to generate a second frequency ramp of the plurality of frequency ramps having the first ramp parameter defined by the second control value.

4. The radar semiconductor chip of claim 3, wherein the second control value is different from the first control value.

5. The radar semiconductor chip of claim 1, wherein:
   the sequencing program further specifies a second data source that is configured to provide a second data value for a second ramp parameter,
   the decoder is further configured to;
      access the second data value from the second data source,
      derive a second control value for the second ramp parameter based on the second data value, and
      provide the first control value and the second control value to the ramp signal generator, and
   the ramp signal generator is further configured to generate the first frequency ramp having the first ramp parameter defined by the first control value and the second ramp parameter defined by the second control value.

6. The radar semiconductor chip of claim 5, wherein:
   the sequencing program defines a third control value for a third ramp parameter of the plurality of ramp parameters,
   the decoder is further configured to:
      extract the third control value for the third ramp parameter defined in the sequencing program, and
      provide the third control value to the ramp signal generator, and
   the ramp signal generator is further configured to generate the first frequency ramp having the first ramp parameter defined by the first control value, the second ramp parameter defined by the second control value, and the third ramp parameter defined by the third control value.

7. The radar semiconductor chip of claim 1, further comprising a memory array as the first data source.

8. The radar semiconductor chip of claim 1, further comprising a data generator as the first data source.

9. The radar semiconductor chip of claim 8, wherein the data generator is a random number generator or an accumulator.

10. The radar semiconductor chip of claim 1, wherein the decoder is further configured to convert the first data value directly into the first control value.

11. The radar semiconductor chip of claim 1, wherein:
   the sequencing program defines a base value of the first control value, and
   the decoder is further configured to;
      extract the base value from the sequencing program,
      access the first data value from the first data source, and
      derive the first control value from the base value and the first data value.

12. The radar semiconductor chip of claim 11, wherein the first data value is an offset value that is added or subtracted from the base value by the decoder to derive the first control value.

13. The radar semiconductor chip of claim 1, wherein the plurality of ramp parameters includes two or more of: a ramp start frequency, a ramp stop frequency, a ramp frequency difference, a ramp time interval, a wait time interval, a phase, a phase offset, and a signal output power.

14. The radar semiconductor chip of claim 1, wherein decoder is further configured to request the first data value from the first data source for deriving the first control value according to the sequencing program on at least one of a ramp segment-by-ramp segment basis, a ramp-by-ramp basis, a subframe-by-subframe basis, or a frame-by-frame basis.

15. The radar semiconductor chip of claim 1, wherein:
the sequencing program defines a second control value for a second ramp parameter of the plurality of ramp parameters,
the decoder is further configured to:
extract the second control value for the second ramp parameter defined in the sequencing program, and
provide the second control value to the ramp signal generator, and
the ramp signal generator is further configured to generate the first frequency ramp having the first ramp parameter defined by the first control value and the second ramp parameter defined by the second control value.

16. The radar semiconductor chip of claim 15, wherein:
the sequencing program further specifies the first data source that is configured to provide a second data value corresponding to the first ramp parameter,
the decoder is further configured to:
access the second data value from the first data source,
derive a third control value for the first ramp parameter therefrom, and
provide the second control value and the third control value to the ramp signal generator, and
the ramp signal generator is further configured to generate a second frequency ramp of the plurality of frequency ramps having the first ramp parameter defined by the third control value and the second ramp parameter defined by the second control value.

17. The radar semiconductor chip of claim 1, wherein the sequencing program includes an identifier of the first data source to selectively specify the first data source for the first data value.

18. The radar semiconductor chip of claim 1, wherein the radar semiconductor chip is configured to operate in real time.

19. A radar semiconductor chip, comprising:
a radar circuit component configured to generate at least part of a frequency-modulated ramp signal or process at least part of a reflected frequency-modulated ramp signal according to a control parameter;
a memory configured to store a sequencing program associated with regulating the control parameter, wherein the sequencing program specifies a first data source, external to the sequencing program, that is configured to provide a first data value corresponding to the control parameter; and
a decoder configured to;
read the sequencing program from the memory,
access the first data value from the first data source specified by the sequencing program,
derive a first control value for the control parameter from the first data value, and
provide the first control value to the radar circuit component,
wherein the radar circuit component is further configured to regulate a controlled circuit function in accordance with the control parameter based on the first control value, and
wherein the radar circuit component, the memory, the first data source, and the decoder are integrated on a same monolithic microwave integrated circuit (MMIC).

20. The radar semiconductor chip of claim 19, wherein:
the first data source is further configured to provide a plurality of first data values corresponding to the control parameter, and
the decoder is further configured to:
sequentially access the plurality of first data values from the first data source,
derive a respective first control value for each of the plurality of first data values to derive a plurality of first control values, and
provide the plurality of first control values to the radar circuit component, and
the radar circuit component is further configured to sequentially regulate the controlled circuit function in accordance with adjustments to the control parameter made by the decoder based on the plurality of first control values.

21. The radar semiconductor chip of claim 19, wherein the control parameter is selected from a ramp start frequency of the frequency-modulated ramp signal, a ramp stop frequency of the frequency-modulated ramp signal, a ramp frequency difference of the frequency-modulated ramp signal, a ramp time interval of the frequency-modulated ramp signal, a ramp wait time interval of the frequency-modulated ramp signal, a phase of the frequency-modulated ramp signal, a phase offset of the frequency-modulated ramp signal, a signal output power of the frequency-modulated ramp signal, a filter configuration of the radar circuit component, a gain configuration of the radar circuit component, a power amplifier configuration of the radar circuit component, a sampling start time of the radar circuit component, a monitoring configuration of the radar circuit component, a chip pin output configuration of the radar semiconductor chip, or data acquisition information of the radar circuit component.

22. The radar semiconductor chip of claim 19, further comprising:
a ramp signal generator configured to;
generate the frequency-modulated ramp signal comprising a plurality of frequency ramps, and
generate the plurality of frequency ramps according to a plurality of ramp parameters,
wherein the sequencing program is further associated with generating the frequency-modulated ramp signal, wherein the sequencing program specifies a second data source, external to the sequencing program, that is configured to provide a second data value corresponding to a first ramp parameter of the plurality of ramp parameters,
wherein the decoder is further configured to:
read the sequencing program from the memory
access the second data value from the second data source specified by the sequencing program,
derive a second control value for the first ramp parameter from the second data value, and provide the second control value to the ramp signal generator, and wherein the ramp signal generator is further configured to generate a first frequency ramp of the plurality of frequency ramps having the first ramp parameter defined by the second control value.

23. A radar semiconductor chip, comprising:
a ramp signal generator configured to;
    generate a frequency-modulated ramp signal comprising a plurality of frequency ramps, and
    generate the plurality of frequency ramps according to a plurality of ramp parameters;
a memory configured to store a sequencing program associated with generating the frequency-modulated ramp signal, wherein the sequencing program defines a dynamic control value for a first ramp parameter of the plurality of ramp parameters, wherein the dynamic control value changes on at least one of a ramp segment-by-ramp segment basis, a ramp-by-ramp basis, a subframe-by-subframe basis, or a frame-by-frame; and
a decoder configured to:
    read the sequencing program from the memory,
    calculate the dynamic control value for each frequency ramp of the plurality of frequency ramps based on a previous control value and an offset control value defined by the sequencing program, and
    provide the dynamic control value to the ramp signal generator,
wherein the ramp signal generator is further configured to generate the plurality of frequency ramps having the first ramp parameter defined by the dynamic control value that changes on the at least one of the ramp segment-by-ramp segment basis, the ramp-by-ramp basis, the subframe-by-subframe basis, or the frame-by-frame according to the offset control value, and
wherein the ramp signal generator, the memory, and the decoder are integrated on a same monolithic microwave integrated circuit (MMIC).

24. The radar semiconductor chip of claim 23, wherein the offset control value is uniform across the plurality of frequency ramps such that the dynamic control value changes by a uniform amount for each frequency ramp of the plurality of frequency ramps.

25. The radar semiconductor chip of claim 23, wherein the offset control value is variable across the plurality of frequency ramps such that the dynamic control value changes by variable amount for each frequency ramp of the plurality of frequency ramps.

26. The radar semiconductor chip of claim 23, wherein:
the sequencing program defines a static control value for a second ramp parameter of the plurality of ramp parameters,
the decoder is further configured to extract the static control value for the second ramp parameter defined in the sequencing program and provide the static control value and the dynamic control value to the ramp signal generator, and
the ramp signal generator is further configured to generate the plurality of frequency ramps having the second ramp parameter defined by the static control value and the second ramp parameter defined by the dynamic control value that changes according to the offset control value.

27. A radar semiconductor chip, comprising:
a radar circuit component configured to generate at least part of a frequency-modulated ramp signal or process at least part of a reflected frequency-modulated ramp signal according to a control parameter;
a memory configured to store a sequencing program associated with regulating the control parameter, wherein the sequencing program defines a dynamic control value for the control parameter, wherein the dynamic control value changes on at least one of a ramp segment-by-ramp segment basis, a ramp-by-ramp basis, a subframe-by-subframe basis, or a frame-by-frame basis of the frequency-modulated ramp signal; and
a decoder configured to;
    read the sequencing program from the memory,
    calculate the dynamic control value based on a previous control value and an offset control value defined by the sequencing program, and
    provide the dynamic control value to the radar circuit component,
wherein the radar circuit component is further configured to regulate a controlled circuit function in accordance with the control parameter based on the dynamic control value that changes on the at least one of the ramp segment-by-ramp segment basis, the ramp-by-ramp basis, the subframe-by-subframe basis, or the frame-by-frame basis according to the offset control value, and
wherein the radar circuit component, the memory, and the decoder are integrated on a same monolithic microwave integrated circuit (MMIC).

28. A method for controlling a radar circuit component of a radar semiconductor chip, wherein the radar circuit component is configured to generate at least part of a frequency-modulated ramp signal or process at least part of a reflected frequency-modulated ramp signal according to a control parameter, the method comprising:
storing, by a memory, a sequencing program associated with regulating the control parameter, wherein the sequencing program specifies a first data source, external to the sequencing program, that is configured to provide a first data value corresponding to the control parameter;
reading, by a decoder, the sequencing program from the memory;
accessing, by the decoder, the first data value from the first data source specified by the sequencing program;
deriving, by the decoder, a first control value for the control parameter from the first data value;
providing, by the decoder, the first control value to the radar circuit component for controlling the control parameter; and
regulating a controlled circuit function, by the radar circuit component, in accordance with the control parameter based on the first control value,
    wherein the radar circuit component, the memory, and the decoder are integrated on a same monolithic microwave integrated circuit (MMIC).

29. The radar semiconductor chip of claim 18, further comprising:
a first-in first-out (FIFO) buffer to:
    receive, from the decoder, the first control value, and
    transmit the control value to the ramp signal generator at a time indicated by a timestamp,
    wherein the FIFO buffer fulfills hard real-time requirements.

30. The radar semiconductor chip of claim 29, wherein the FIFO buffer and the decoder fulfill soft-real time requirements.

\* \* \* \* \*